(12) United States Patent
Noh et al.

(10) Patent No.: US 11,184,075 B2
(45) Date of Patent: Nov. 23, 2021

(54) METHOD AND APPARATUS FOR SETTING REFERENCE SIGNAL FOR NONLINEAR PRECODING

(71) Applicant: Samsung Electronics Co., Ltd., Gyeonggi-do (KR)

(72) Inventors: Hoondong Noh, Gyeonggi-do (KR); Youngwoo Kwak, Gyeonggi-do (KR); Cheolkyu Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/957,967

(22) PCT Filed: Dec. 28, 2018

(86) PCT No.: PCT/KR2018/016930
§ 371 (c)(1),
(2) Date: Jun. 25, 2020

(87) PCT Pub. No.: WO2019/132622
PCT Pub. Date: Jul. 4, 2019

(65) Prior Publication Data
US 2020/0373987 A1    Nov. 26, 2020

(30) Foreign Application Priority Data

Dec. 28, 2017   (KR) .................. 10-2017-0182046

(51) Int. Cl.
*H04K 1/10*         (2006.01)
*H04L 27/28*        (2006.01)
(Continued)

(52) U.S. Cl.
CPC ......... *H04B 7/0628* (2013.01); *H04B 7/0456* (2013.01); *H04L 5/0012* (2013.01); *H04L 5/0023* (2013.01); *H04L 5/0048* (2013.01)

(58) Field of Classification Search
CPC ... H04B 7/0628; H04B 7/0456; H04L 5/0012; H04L 5/0023; H04L 5/0048; H04W 76/10
(Continued)

(56) References Cited

U.S. PATENT DOCUMENTS

2013/0094448 A1    4/2013  Noh et al.
2015/0009851 A1    1/2015  Yan et al.
(Continued)

FOREIGN PATENT DOCUMENTS

KR    1020190056850    5/2019

OTHER PUBLICATIONS

PCT/ISA/210 Search Report issued on PCT/KR2018/016930, dated Apr. 5, 2019, pp. 9.
(Continued)

*Primary Examiner* — Phuong Phu
(74) *Attorney, Agent, or Firm* — The Farrell Law Firm, P.C.

(57) ABSTRACT

The present disclosure relates to a communication technique for combining a 5G communication system with IoT technology to support a higher data transmission rate than a 4G system, and a system thereof. The present disclosure can be applied to 5G communication and IoT related technology-based intelligent services (for example, smart homes, smart buildings, smart cities, smart cars or connected cars, health care, digital education, retail business, security and safety related services, etc.). In addition, the present disclosure relates to a method and an apparatus for setting a reference signal in a 5G or NR system. Disclosed is a method of a terminal in a wireless communication system, the method comprising the steps of: transmitting capability information (UE capability) of the terminal to a base station; and receiving, from the base station, nonlinear precoding related information identified on the basis of the capability infor- (Continued)

mation of the terminal, wherein the nonlinear precoding related information includes information on whether or not nonlinear precoding is applied, and information for controlling reference signal settings, and wherein the information on whether or not the nonlinear precoding is applied indicates whether or not a modulo operation is applied.

15 Claims, 20 Drawing Sheets

(51) Int. Cl.
  *H04B 7/06* (2006.01)
  *H04B 7/0456* (2017.01)
  *H04L 5/00* (2006.01)
(58) Field of Classification Search
  USPC ....... 375/260, 295, 316, 219, 220, 222, 267, 375/299, 346, 347
  See application file for complete search history.

(56) References Cited

U.S. PATENT DOCUMENTS

2015/0155966 A1   6/2015  Zeng et al.
2016/0049997 A1*  2/2016  Onodera ............... H04W 76/10
                                                              370/329

OTHER PUBLICATIONS

PCT/ISA/237 Written Opinion issued on PCT/KR2018/016930, dated Apr. 5, 2019, pp. 5.
Mitsubishi Electric, 'Views on possible specification impacts of nonlinear precoding schemes', R1-1700877, 3GPP TSG-RAN WG1 NR AH, Spokane, WA, USA, Jan. 10, 2017, p. 5.
Nokia etc, 'Nonlinear Precoding for Interference Mitigation in HetNets', R1-1703186, 3GPP TSG RAN WG1#88, Athens, Greece, Feb. 6, 2017, p. 11.

* cited by examiner

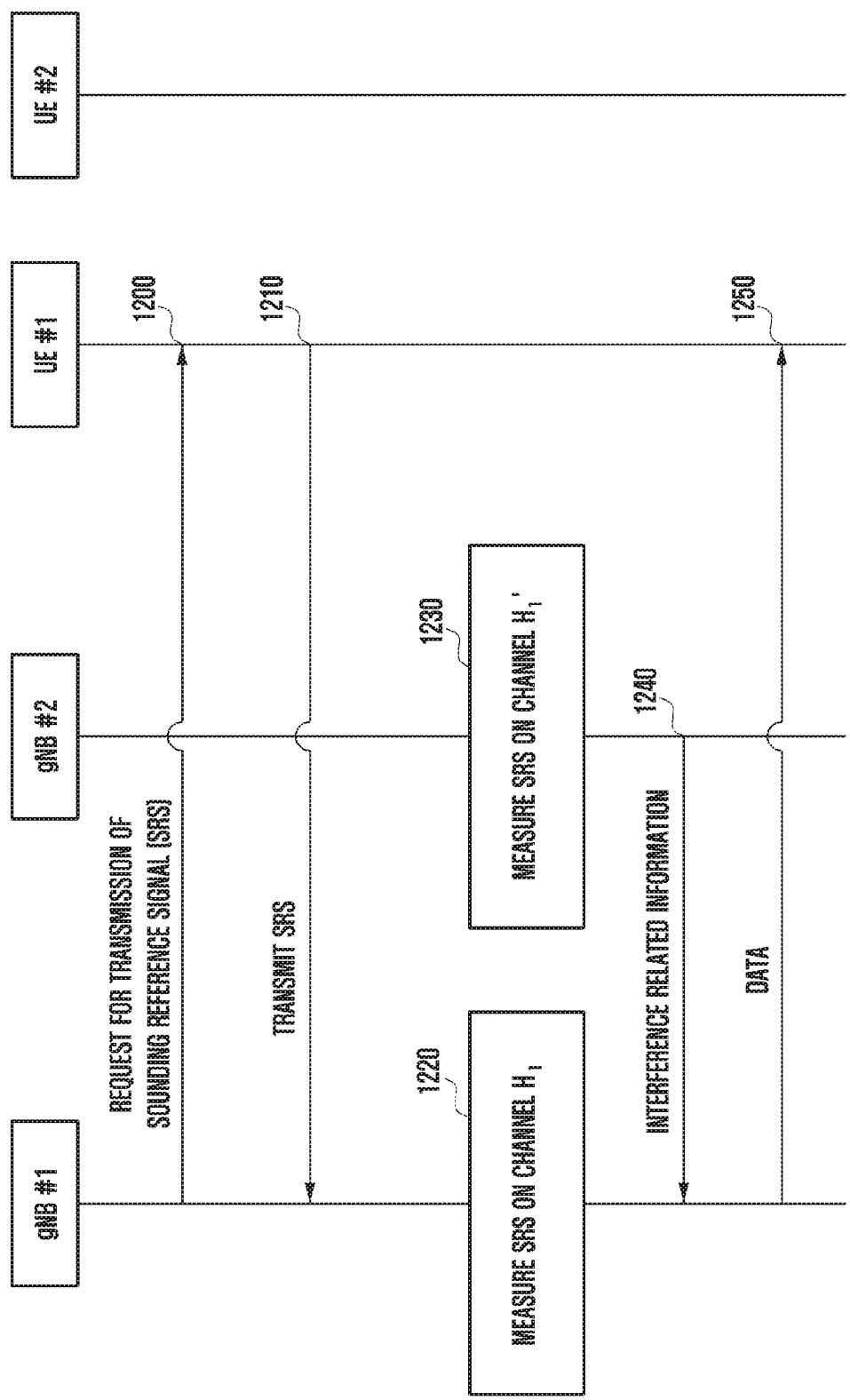

FIG. 16

$$\tilde{y} = Bs + \tilde{z} = \begin{bmatrix} 1 & 0 & 0 & 0 \\ l_{21} & 0 & \cdots & 0 \\ \vdots & \vdots & \ddots & \vdots \\ l_{K1} & l_{K2} & \cdots & 1 \end{bmatrix} \begin{pmatrix} x_1 \\ x_2 - l_{21}s_1 \\ x_3 - l_{31}s_1 - l_{32}s_2 \\ \vdots \\ x_K - \sum_{m=1}^{K-1} l_{Km}s_m \end{pmatrix} + \begin{bmatrix} \tilde{z}_1 \\ \tilde{z}_2 \\ \vdots \\ \tilde{z}_K \end{bmatrix}$$

$$= \begin{bmatrix} x_1 \\ l_{21}x_1 + x_2 - l_{21}s_1 \\ l_{31}s_1 + l_{32}s_2 + x_3 - l_{31}s_1 - l_{32}s_2 \\ \vdots \\ \sum_{m=1}^{K-1} l_{Km}s_m + x_K - \sum_{m=1}^{K-1} l_{Km}s_m \end{bmatrix} + \begin{bmatrix} \tilde{z}_1 \\ \tilde{z}_2 \\ \vdots \\ \tilde{z}_K \end{bmatrix} = \begin{bmatrix} x_1 \\ x_2 \\ x_3 \\ \vdots \\ x_K \end{bmatrix} + \begin{bmatrix} \tilde{z}_1 \\ \tilde{z}_2 \\ \vdots \\ \tilde{z}_K \end{bmatrix}$$

$$\tilde{y} = Bs + \tilde{z} = \begin{bmatrix} 1 & 0 & 0 & 0 \\ l_{21} & 0 & \cdots & 0 \\ \vdots & \vdots & \ddots & \vdots \\ l_{K1} & l_{K2} & \cdots & 1 \end{bmatrix} \begin{pmatrix} x_1 \\ x_2 - l_{21}s_1 \\ x_3 - l_{31}s_1 - l_{32}s_2 \\ \vdots \\ x_K - \sum_{m=1}^{K-1} l_{Km}s_m \end{pmatrix} + \begin{bmatrix} \tilde{z}_1 \\ \tilde{z}_2 \\ \vdots \\ \tilde{z}_K \end{bmatrix}$$

Interference signal at Rx $$= \begin{bmatrix} x_1 \\ \boxed{l_{21}x_1 + x_2} - \boxed{l_{21}s_1} \\ \boxed{l_{31}s_1 + l_{32}s_2} + x_3 - \boxed{l_{31}s_1 - l_{32}s_2} \\ \vdots \\ \boxed{\sum_{m=1}^{K-1} l_{Km}s_m} + x_K - \boxed{\sum_{m=1}^{K-1} l_{Km}s_m} \end{bmatrix} + \begin{bmatrix} \tilde{z}_1 \\ \tilde{z}_2 \\ \vdots \\ \tilde{z}_K \end{bmatrix} = \begin{bmatrix} x_1 \\ x_2 \\ x_3 \\ \vdots \\ x_K \end{bmatrix} + \begin{bmatrix} \tilde{z}_1 \\ \tilde{z}_2 \\ \vdots \\ \tilde{z}_K \end{bmatrix}$$

Pre-eliminated Interference at Tx

METHOD AND APPARATUS FOR SETTING REFERENCE SIGNAL FOR NONLINEAR PRECODING

PRIORITY

This application is a National Phase Entry of PCT International Application No. PCT/KR2018/016930 which was filed on Dec. 28, 2018, and claims priority to Korean Patent Application No. 10-2017-0182046, which was filed on Dec. 28, 2017, the content of each of which is incorporated herein by reference.

TECHNICAL FIELD

The disclosure relates to a wireless communication system, and further relates to a method and an apparatus for actively providing a service in the wireless communication system.

Specifically, the disclosure relates to a method and an apparatus for configuring a reference signal in a 5G or NR system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In this regard, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

It has been assumed in a 3G or 4G wireless communication system that linear precoding (LP) based on a discrete Fourier transform (DFT) codebook is used in a base station, and it has been assumed in a terminal that data is demodulated using a receiver based on a minimum mean square error (MMSE) or a receiver based on successive interference cancelation (MMSE-SIC). However, linear precoding and a receiver therefor have simple structures, but have disadvantages in that performance for cancelation of interference between signal sources is not efficient.

DISCLOSURE OF INVENTION

Technical Problem

Various embodiments of the disclosure propose a method and an apparatus for actively providing a service in a wireless communication system.

In addition, various embodiments of the disclosure provide a method for configuring a reference signal in a 5G wireless communication system to support non-linear precoding (NLP).

Specifically, nonlinear precoding may be key technology for improving performance for cancelation of interference between signal sources in a 5G wireless communication system. However, a modulo operation needs to be used at a transmission/reception end, and channel estimation in a base station needs to be very accurate because interference should be accurately cancelled in advance.

Various embodiments of the disclosure propose methods for configuring reference signals to acquire channel information.

Various embodiments of the disclosure provide methods for configuring sounding reference signals (SRSs) or channel state information reference signals (CSI-RSs) to acquire accurate base station channel information, in case that the nonlinear precoding is applied.

In addition, various embodiments of the disclosure propose methods for receiving demodulation reference signals (DMRSs) of a terminal, which are for nonlinear precoding.

Solution to Problem

Solution to Problem The technical subjects pursued in the disclosure may not be limited to the above-mentioned technical subjects, and other technical subjects which are not mentioned may be clearly understood, through the following descriptions, by those skilled in the art to which the disclosure pertains.

Various embodiments of the disclosure provide a method for configuring a reference signal in a 5G wireless communication system to support non-linear precoding (NLP).

Various embodiments of the disclosure provide a method of a terminal in a wireless communication system, the method including: transmitting capability information (UE capability) of the terminal to a base station; and receiving, from the base station, nonlinear precoding related information identified based on the capability information of the terminal, wherein the nonlinear precoding related information includes information for determining whether or not nonlinear precoding is applied, and information for controlling reference signal configuration, and wherein the information on whether or not the nonlinear precoding is applied indicates whether or not a modulo operation is applied.

Various embodiments of the disclosure provide a method of a base station in a wireless communication system, the method including: receiving, from a terminal, capability information (UE capability) of the terminal; identifying nonlinear precoding related information, based on the capability information of the terminal; and transmitting the nonlinear precoding related information to the terminal, wherein the nonlinear precoding related information includes information on whether or not nonlinear precoding is applied, and information for controlling reference signal configuration, and wherein the information on whether or not the nonlinear precoding is applied indicates whether or not a modulo operation is applied.

A terminal in a wireless communication system according to various embodiments of the disclosure may include: a transmitter/receiver; and a controller coupled to the transmitter/receiver, wherein the controller controls the transmitter/receiver so as to transmit capability information (UE capability) of the terminal to a base station and receive, from the base station, nonlinear precoding related information identified based on the capability information of the terminal, wherein the nonlinear precoding related information includes information on whether or not nonlinear precoding is applied, and information for controlling reference signal configuration, and wherein the information on whether or not the nonlinear precoding is applied indicates whether or not a modulo operation is applied.

A base station in a wireless communication system may include a transmitter/receiver; and a controller coupled to the transmitter/receiver, wherein the controller controls the transmitter/receiver so as to receive, from a terminal, capability information (UE capability) of the terminal, identifies nonlinear precoding related information, based on the capability information of the terminal, and controls the transmitter/receiver so as to transmit the nonlinear precoding related information to the terminal, wherein the nonlinear precoding related information includes information on whether or not nonlinear precoding is applied, and information for controlling reference signal configuration, and wherein the information on whether or not the nonlinear precoding is applied indicates whether or not a modulo operation is applied.

Advantageous Effects of Invention

An embodiment of the disclosure may provide a method and an apparatus for actively providing a service in a wireless communication system.

In addition, various embodiments of the disclosure may provide a base station or terminal operation for supporting a channel and interference estimation method for nonlinear precoding-based transmission.

A method for configuring reference signals according to various embodiments of the disclosure may support the application of nonlinear precoding by acquiring accurate channel information in a base station.

BRIEF DESCRIPTION OF DRAWINGS

FIG. 12B illustrates operations of a terminal and a base station for applying NLP between terminals existing in cells different from each other (different TRPs or different beams) in a time division duplexing (TDD) system, based on the signaling according to various embodiments of the disclosure.

FIG. 16 is an illustration of an equation of a matrix that is equivalent to Equation 4, whereby a terminal may identify that a signal in which interference is canceled is received according to the structures of FIGS. 7 and 8.

MODE FOR THE INVENTION

Figure 1:
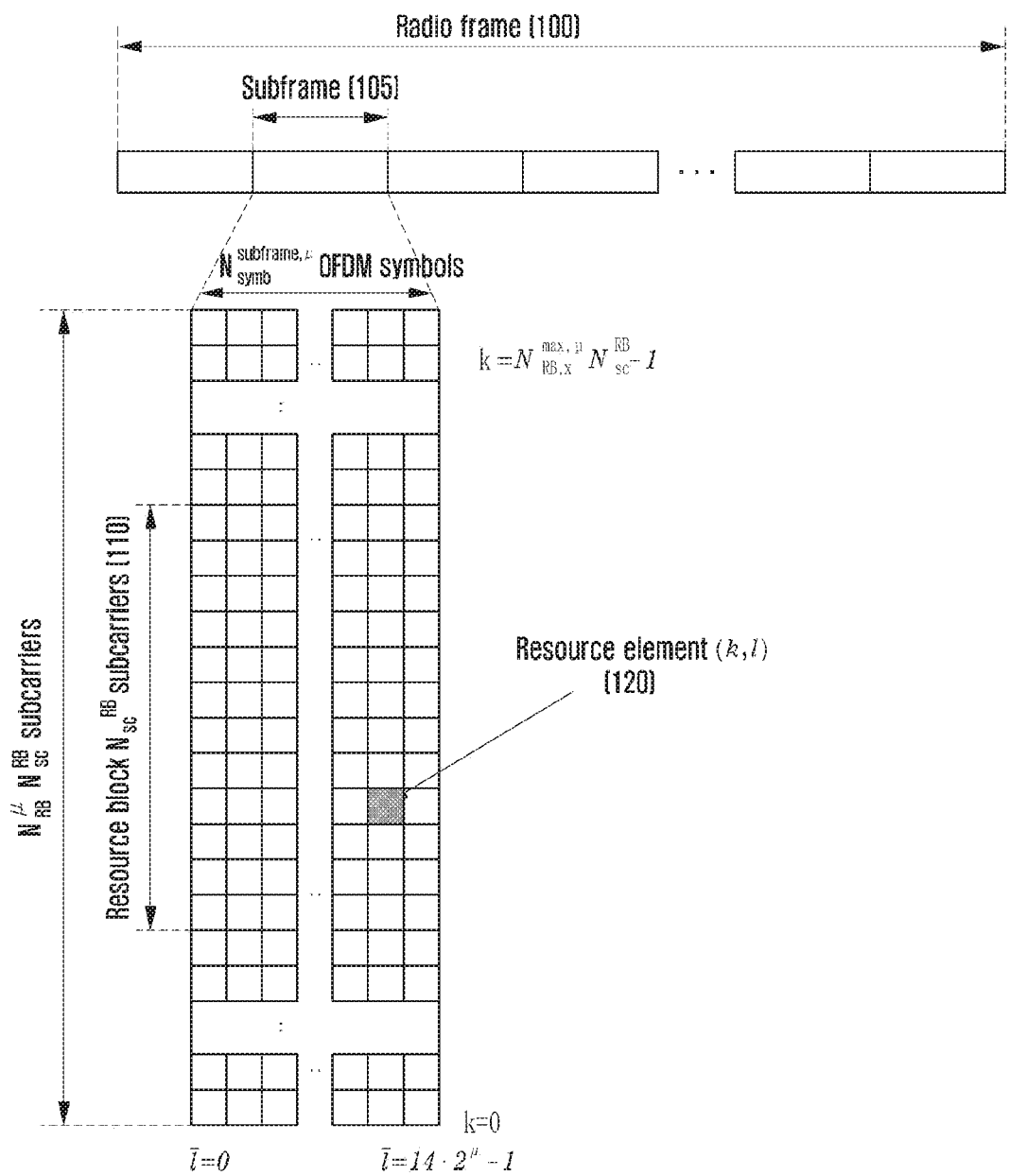
FIG. 1 illustrates basic structures of time and frequency regions which are wireless resource regions in a 5G or NR system according to various embodiments of the disclosure.

Hereinafter, exemplary embodiments of the disclosure will be described in detail in conjunction with the accompanying drawings. It should be noted that in the drawings, identical elements are designated by the same reference signs if possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Departing from the early days of providing audio-centered services, a wireless communication system is developing into a broadband wireless communication system for providing high-speed and high-quality packet data services such as communication standards including high speed packet access (HSPA) of 3GPP, long term evolution (LTE) or evolved universal terrestrial radio access (E-UTRA), LTE-advanced (LTE-A), high rate packet data (HRPD) of 3GPP2, ultra mobile broadband (UMB), 802.16e of IEEE, and the like. In addition, communication standards such as 5G or new radio (NR) are being devised as a fifth-generation wireless communication system.

As a representative example of the broadband wireless communication system, in an LTE system, an orthogonal frequency division multiplexing (OFDM) scheme is adopted for a downlink (DL), and a single carrier frequency division multiple access (SC-FDMA) scheme is adopted for an uplink (UP). An uplink means a wireless link by which user equipment (UE), a terminal, or a mobile station (MS) transmits data or a control signal to a base station (an eNode B or a base station (BS)), and a downlink means a wireless link by which a base station transmits data or a control signal to a terminal. The multiple access scheme generally divides data or control information of each user by assigning and operating time and frequency resources for carrying data or control information for each user, such that the time and frequency resources do not overlap each other, that is, such that orthogonality is established.

In case that an LTE or NR system experiences a decoding failure in initial transmission, a hybrid automatic repeat request (HARQ) scheme for retransmitting corresponding data from a physical layer is adopted. In case that a receiver fails to accurately decode data, an HARQ scheme allows the receiver to transmit information for notifying a decoding failure (negative acknowledgement, NACK) to a transmitter so as to allow the transmitter to retransmit corresponding data from a physical layer. A receiver has improved data reception performance by coupling data retransmitted by a transmitter with previous data, decoding of which failed. In addition, when a receiver accurately decodes data, information for notifying a success of decoding (acknowledgement, ACK) is transmitted to a transmitter so as to allow the transmitter to transmit new data.

FIG. 1 illustrates basic structures of time and frequency regions which are wireless resource regions in a 5G or NR system according to various embodiments of the disclosure.

Referring to FIG. 1, a horizontal axis refers to a time region, and a longitudinal axis refers to a frequency region. A minimum transmission unit in a time region is an orthogonal frequency-division multiplexing (OFDM) symbol in the case of a downlink, and in the case of an uplink, as OFDM symbols or discrete Fourier transform (DFT) spread OFDM symbols (DFT-S-OFDM symbols), fourteen symbols are gathered and constitute one slot ($N_{symb}^{slot}$) in the case of normal cyclic shift (normal cyclic prefix, NCP).

In addition, according to numerology supported in NR, one or more symbols are gather and constitute one subframe 105. One subframe is defined as 1 ms. The number of OFDM symbols or DFT-S-OFDM symbols constituting a subframe is as shown in table 1 and table 2 below.

TABLE 1

Number of OFDM symbols per slot, $N_{symb}^{slot}$ for normal cyclic prefix

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

Number of OFDM symbols per slot, $N_{slot}^{symb, \mu}$, for extended cyclic prefix

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

A minimum transmission unit in a frequency region is a subcarrier, and a total system transmission bandwidth is composed of a total of $N_{RB,x}^{max,\mu} \cdot N_{sc}^{RB}$ number of subcarriers. Here, a value of $N_{RB,x}^{max,\mu}$ is given in table 3 with respect to an uplink and a downlink. In addition, $N_{sc}^{RB}$ corresponds to a resource block 110, and is defined as twelve continuous subcarriers in a frequency region. A basic unit of a resource in a time-frequency region is a resource element (RE) 41020, and may be defined as an OFDM/DFT-S-OFDM symbol index and a subcarrier index.

TABLE 3

| $\mu$ | $N_{RB,DL}^{min,\mu}$ | $N_{RB,DL}^{max,\mu}$ | $N_{RB,UL}^{min,\mu}$ | $N_{RB,UL}^{max,\mu}$ |
|---|---|---|---|---|
| 0 | 20 | 275 | 24 | 275 |
| 1 | 20 | 275 | 24 | 275 |
| 2 | 20 | 275 | 24 | 275 |
| 3 | 20 | 275 | 24 | 275 |
| 4 | 20 | 138 | 24 | 138 |
| 5 | 20 | 69 | 24 | 69 |

In an NR system, various slot structures are supported so as to flexibly deal with downlink and uplink capacity requirements, which change according to the environment, such as time and operation scenarios.

Figure 2:
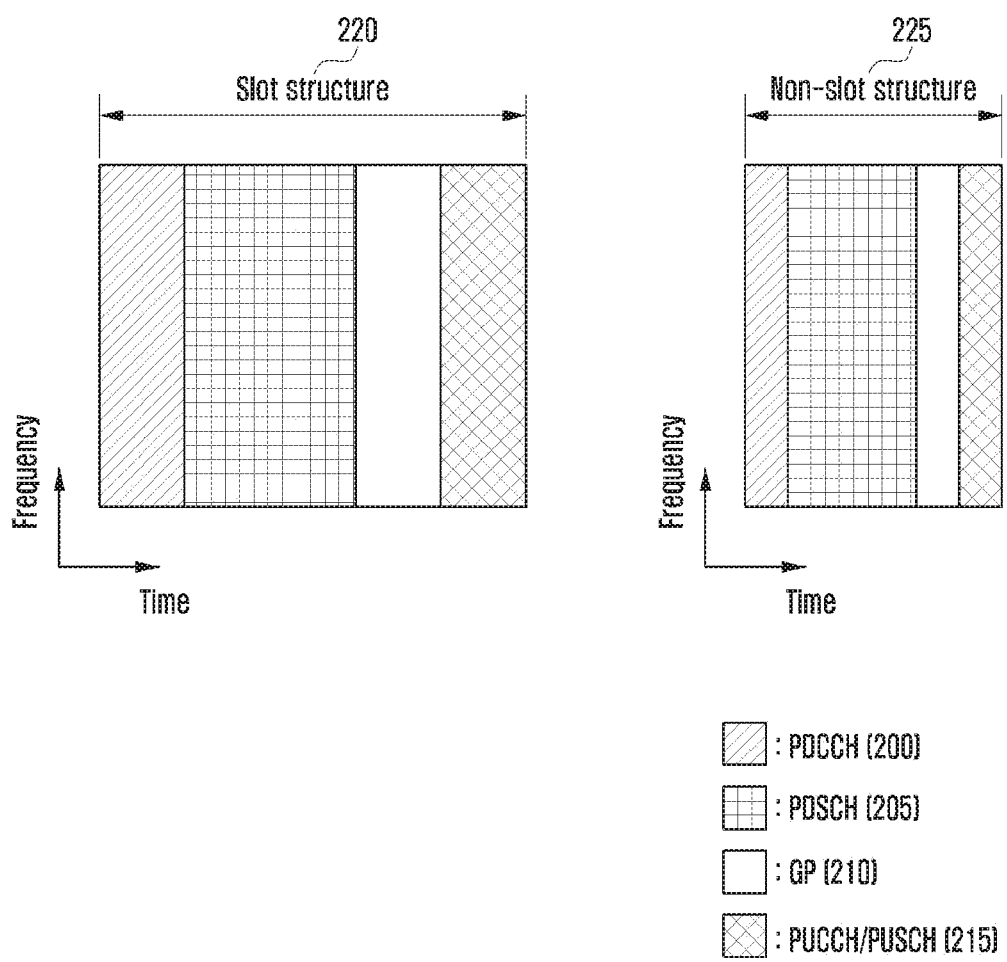
FIG. 2 illustrates various examples of slot structures in a 5G or NR system according to various embodiments of the disclosure.

FIG. 2 illustrates various examples of slot structures in a 5G or NR system according to various embodiments of the disclosure.

Referring to FIG. 2, in NR, PDSCHs having various lengths may be configured for terminals, and the configuration values include at least one of values of a slot structure 220 having the same length as that of a slot composed of fourteen OFDM symbols or a non-slot structure 225 having a length shorter than that of a slot composed of one, two, . . . , or seven OFDM symbols.

The non-slot structure is one example of expression and may be expressed by various terms such as "mini slot" and "short slot" when the non-slot structure is applied in practice.

A frequency/time resource period unit configured as the slot or non-slot structure may be divided, specifically from the viewpoint of a time axis, into downlink (DL only), mixed up/downlink (UL/DL mixed, similar to an LTE special subframe structure), and uplink (UL only) structures.

Embodiments of FIG. 2 will be described in accordance with an up/downlink mixed structure considered to be the most general structure. In this case, DL only or UL only may be considered to be a special case of UL/DL mixed. In an up/downlink mixed structure, one slot or non-slot structure includes at least one of a downlink part (a DL part), a guard period (GP) 210, and an uplink part (a UL part).

As illustrated in FIG. 2, the DL part may include at least one channel from among a physical downlink control channel (PDCCH) 200 or a physical downlink data channel (PDSCH) 205. In addition, the DL part may include at least one reference signal from among downlink reference signals (DL RSs) such as a channel state information reference signal (CSI-RS) and a downlink (DL) demodulation reference signal (DMRS).

As illustrated in FIG. 2, the UL part may include at least one channel from among a physical uplink control channel (PUCCH) or a physical uplink data channel (PUSCH) 215.

In addition, the UL part may include may include at least one reference signal from among uplink reference signals (UL RSs) such as a sounding reference signal (SRS) and an uplink (UL) demodulation reference signal (DMRS).

Here, a guard period is a guard period during which a DL shifts to a UL, and a terminal does not need to transmit/receive data during this period, and thus operations for UL/DL shift, in which timing alignment is performed or a wireless frequency chain (an RF chain) is converted, may be performed.

Downlink control information is transmitted within first N number of OFDM symbols in the subframe. Generally, N may satisfy N={1, 2, 3}. Accordingly, the value of N varies every subframe according to the amount of current control information to be transmitted to a subframe. For example, control information includes at least one of a control channel transmission period indicator for indicating the number of OFDM symbols through which control information is transmitted, scheduling information on downlink data or uplink data, a hybrid automatic repeat and request (HARQ) positive-acknowledgement (ACK)/negative-acknowledgement (NACK) signal, and the like.

In an LTE or NR system, scheduling information on downlink data or uplink data is transferred from a base station to a terminal through downlink control information (DCI).

Various DCI formats may be defined, wherein an operated DCI format is determined according to whether scheduling information is scheduling information (UL grant) on uplink data or is scheduling information (DL assignment) on downlink data, whether or not DCI is compact DCI having control information, the size of which is small, whether or not spatial multiplexing using multiple antennas is applied, whether or not DCI is DCI for power control, and the like.

For example, DCI format 1, which is scheduling control information (DL assignment) on downlink data, is configured to include control information as follows.

Resource allocation type 0/1 flag: Whether a resource assignment scheme is type 0 or type 1 is notified. Type 0 assigns resources in a resource block group (RBG) unit by applying a bitmap scheme. In an LTE system, a basic unit of scheduling is an RB represented by time and frequency region resources, and an RBG composed of a plurality of RBs is a basic unit of scheduling in a type 0 scheme. Type 1 assigns a specific RB in an RBG.

Resource block assignment: An RB assigned for data transmission is notified. An expressed resource is determined according to a system bandwidth and a resource assignment scheme.

Modulation and coding scheme (MCS): A modulation scheme used for data transmission and the size of a transmission block (TB), which is data to be transmitted, are notified.

HARQ process number: A process number of an HARQ is notified.

New data indicator: Whether transmission is HARQ initial transmission or retransmission is notified.

Redundancy version: A redundancy version of an HARQ is notified.

Transmit power control (TPC) command for physical uplink control channel (PUCCH): A transmit power control command for a PUCCH, which is an uplink control channel, is notified.

The DCI is transmitted through a physical downlink control channel (PDCCH) (or control information, which will be used in combination therewith hereinafter) which is a channel for physically controlling a downlink, or an enhanced PDCCH (EPDCCH) (or improved control information, which will be used in combination therewith hereinafter), via channel coding and modulation processes.

Generally, the DCI is scrambled as a specific wireless network temporary identifier (radio network temporary identifier, RNTI) (or a terminal identifier) independently for each terminal, is thus added with a cyclic redundancy check (CRC), is channel-coded, and then is transmitted in a state of being composed of an independent PDCCH. In a time region, a PDCCH is transmitted after being mapped during a control channel transmission period. A frequency region mapping position of a PDCCH is determined by an identifier (ID) of each terminal, and is spread to an entire system transmission band.

Downlink data is transmitted through a physical downlink shared channel, which is a physical channel for transmitting downlink data. A PDSCH is transmitted after a control channel transmission period, wherein DCI transmitted through the PDCCH provides notification as to scheduling information such as a specific mapping position in a frequency region and a modulation scheme.

Through an MCS of 5 bit from among pieces of control information constituting the DCI, a base station notifies a terminal of a modulation scheme applied to a PDSCH to be transmitted and the size of data to be transmitted (a transport block size, TBS). The TBS corresponds to a size before channel coding for error correction is applied to data (a transport block, TB) to be transmitted by a base station.

Figure 3:
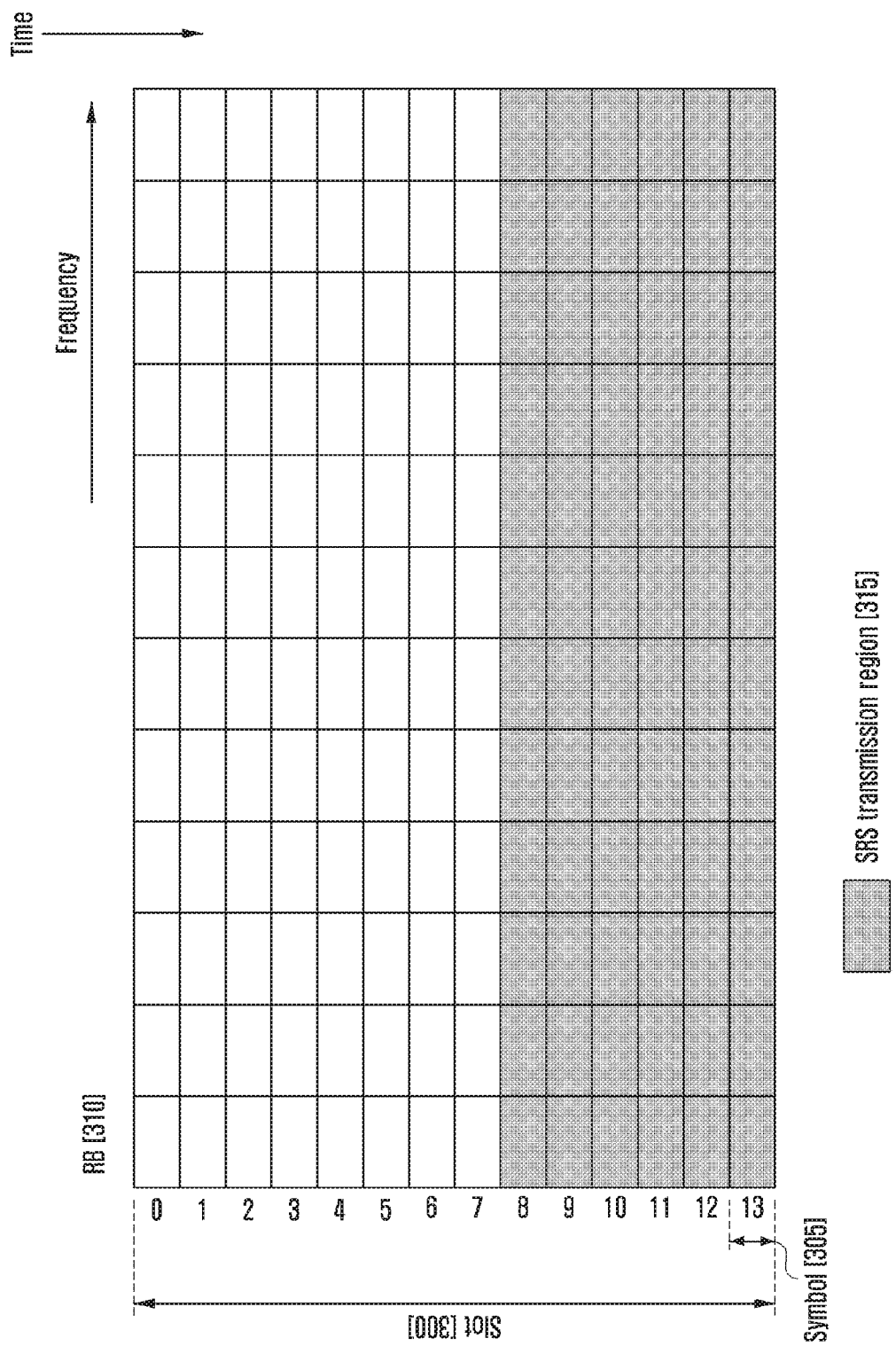
FIG. 3 illustrates an uplink transmission structure in a 5G or NR system according to various embodiments of the disclosure.

FIG. 3 illustrates an uplink transmission structure in a 5G or NR system according to various embodiments of the disclosure.

Referring to FIG. 3, a basic transmission unit of a 5G or NR system is a slot 300, and when a general cyclic prefix (CP) length is assumed, each slot is composed of fourteen symbols 305, wherein one symbol corresponds to one uplink waveform (UL waveform) (for example, CP-OFDM or DFT-S-OFDM) symbol.

A resource block (RB) 310 is a resource assignment unit corresponding to one slot, based on a time region, and is composed of twelve subcarriers, based on a frequency region.

An uplink structure is mainly divided into a data region and a control region. Unlike an LTE system, in a 5G or NR system, a control region may be transmitted after being configured in an optional position of an uplink. Here, a data region includes a series of communication resources including data, such as a sound and a packet, transmitted to each terminal, and corresponds to resources other than a control region in a subframe. A control region includes a series of communication resources for a report on downlink channel quality from each terminal, downlink signal reception ACK/NACK, a request for uplink scheduling, and the like.

A terminal may simultaneously transmit its own data and control information from a data region and a control region. A symbol in which a terminal may periodically transmit SRSs in one slot may be in final six symbol periods 315, and may be transmitted through a data transmission band, based on a frequency region. However, this is merely an example, and a symbol that may transmit an SRS may also be transmitted through another time period or frequency band. When being transmitted through a frequency region, RBs that may transmit SRSs are transmitted in multiples of 4 RB, and a maximum of 272 RB may be transmitted. In addition, in a 5G or NR system, N, which is the number of symbols of an SRS, may be configured to be 1, 2, or 4, and transmission may be performed in continuous symbols. In addition, in a 5G or NR system, repetitive transmission of SRS symbols is allowed. Specifically, a repetitive transmission factor (a repetition factor) of an SRS symbol may be configured to satisfy r∈{1,2,4}, wherein r≤N. For example, when one SRS antenna is transmitted after being mapped in one symbol, a maximum of four symbols may be repetitively transmitted. On the contrary, four antenna ports different from each other may be transmitted to four symbols different from each other. In this case, since each antenna port is mapped in one symbol, repetitive transmission of SRS symbols is not allowed.

In the case of LTE/NR, an SRS is configured, based on pieces of higher layer signaling information (or subsets thereof) as follows.

BandwidthConfig: SRS bandwidth information is configured. SRS sequence length and frequency axis position indicator combination indicated by each of code points may vary according to an uplink system BW value.

SubframeConfig (or ConfigIndex): SRS transmission period and transmission offset values are configured. An accurate value meant by each of code points may vary according to whether duplexing is FDD or TDD.

ackNackSRS-SimultaneousTransmission: ACK/NACK—SRS simultaneous transmission or non-transmission is notified.

MaxUpPts: Whether or not a frequency position of SRS transmission is initialized at UpPTS is notified.

Hopping: Whether or not SRS frequency hopping is performed, a hopping position, and a hopping method are notified with 2 bit information.

Frequency domain position: A frequency domain position of SRS transmission is notified.

Duration: Whether or not a periodic SRS is transmitted is notified.

Transmission comb: A comb offset value at the time of SRS transmission is notified.

Cyclic shift: A cyclic shift value at the time of SRS transmission is notified.

Antenna port: The number of SRS antenna ports used at the time of SRS transmission is notified. In the case of LTE, one, two, or four ports may be supported.

In the case of an LTE/LTE-A system, periodic or aperiodic SRS transmission is supported, based on the configured pieces of information. In the case of an NR system, additional pieces of information such as an activation/deactivation signaling for SRS resources may be used other than the configured pieces of information, and periodic transmission, semi-persistent transmission, and aperiodic SRS transmission are supported. A part of the configured pieces of information may be omitted according to a transmission type of an SRS, for example, according to whether SRS transmission is periodic, semi-persistent, or aperiodic.

An SRS is composed of constant amplitude zero auto correlation (CAZAC) sequences. In addition, CAZAC sequences constituting each of SRSs transmitted from various terminals have cyclic shift values different from each other. In addition, CAZAC sequences produced via cyclic shift from one CAZAC sequence have a characteristic of having a correlation value of zero with sequences having cyclic shift values different from those of the CAZAC sequences, respectively. SRSs simultaneously assigned in an identical frequency region by using such a characteristic may be divided according to a CAZAC sequence cyclic shift value configured for each SRS in a base station.

SRSs of various terminals may be divided according to not only a cyclic shift value but also a frequency position. A frequency position is divided by SRS sub-band unit assignment or combs. In a 5G or NR system, Comb2 and Comb4 are supported, and in the case of Comb2, one SRS is assigned only in either of an even-numbered subcarrier or odd-numbered subcarrier in an SRS sub-band, wherein each of the even-numbered subcarrier and the odd-numbered subcarrier constitutes one comb.

Each terminal is assigned with an SRS sub-band, based on a tree structure. In addition, a terminal performs hopping on an SRS assigned in each sub-band at every SRS transmission point of time. Accordingly, all transmission antennas of a terminal may transmit an SRS to an entire uplink data transmission bandwidth.

Figure 4:
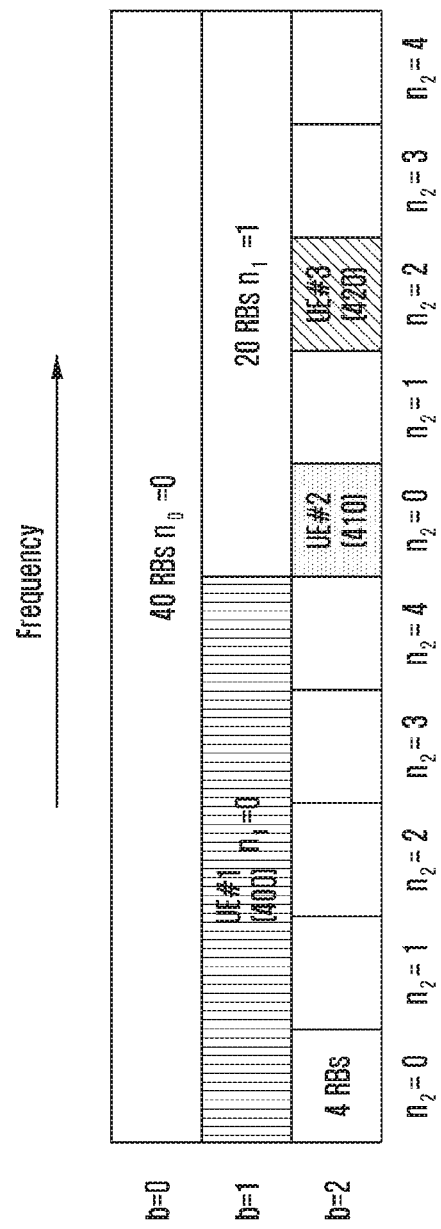
FIG. 4 illustrates a structure in which an SRS is assigned for each sub-band according to various embodiments of the disclosure.

FIG. 4 illustrates a structure in which an SRS is assigned for each sub-band according to various embodiments of the disclosure.

Referring to FIG. 4, an example is shown in which when a data transmission band corresponding to 40 RB is present on a frequency, an SRS is assigned in each terminal by a tree structure configured by a base station.

In FIG. 4, when a level index of a tree structure is denoted as b, the highest level (b=0) of a tree structure is composed of one SRS sub-band having a bandwidth of 40 RB. At a second level (b=1), two SRS sub-bands having a bandwidth of 20 RB are produced from an SRS sub-band of the level b=0. Accordingly, two SRS sub-bands are present in an entire data transmission band of a second level (b=1). At a third level (b=2), there is a structure in which five 4 RB SRS sub-bands are produced from one 20 RB SRS sub-band of the immediately higher level (b=1), and ten 4RB SRS sub-bands are present in one level.

The constituents of such a tree structure include, according to configuration by a base station, the number of various levels, the size of an SRS sub-band, and the number of SRS sub-bands per level. Here, the number of SRS sub-bands of level b produced from one SRS sub-band of a higher level may be defined as Nb, and an index for the Nb number of SRS sub-bands may be defined as nb={0, . . . , Nb−1}. That is, since a sub-band for each level varies, a terminal is assigned for a sub-band of each level as illustrated in FIG. 4. For example, terminal 1 400 may be assigned for a first SRS sub-band (n1=0) from among two SRS sub-bands having a bandwidth of 20 RB in a level, b=1, and terminal 2 410 and terminal 3 420 may be assigned in a first SRS sub-band (n2=0) position and a third SRS sub-band (n2=2) position under a second 20 RB SRS sub-band, respectively. Through these processes, a terminal may simultaneously transmit SRSs via multiple component carrier (CC), and may simultaneously transmit SRSs to multiple SRS sub-bands in one CC.

As described above, a 5G or NR terminal supports an SU-MIMO technique and has a maximum of four transmission antennas. In addition, a 5G or NR terminal may simultaneously transmit SRSs to multiple CCs or multiple SRS sub-bands in a CC. In contrast to an LTE system, in the case of a 5G or NR system, various numerologies are supported, SRS transmission symbols may be variously configured, and repetitive SRS transmission may be allowed.

Figure 5:
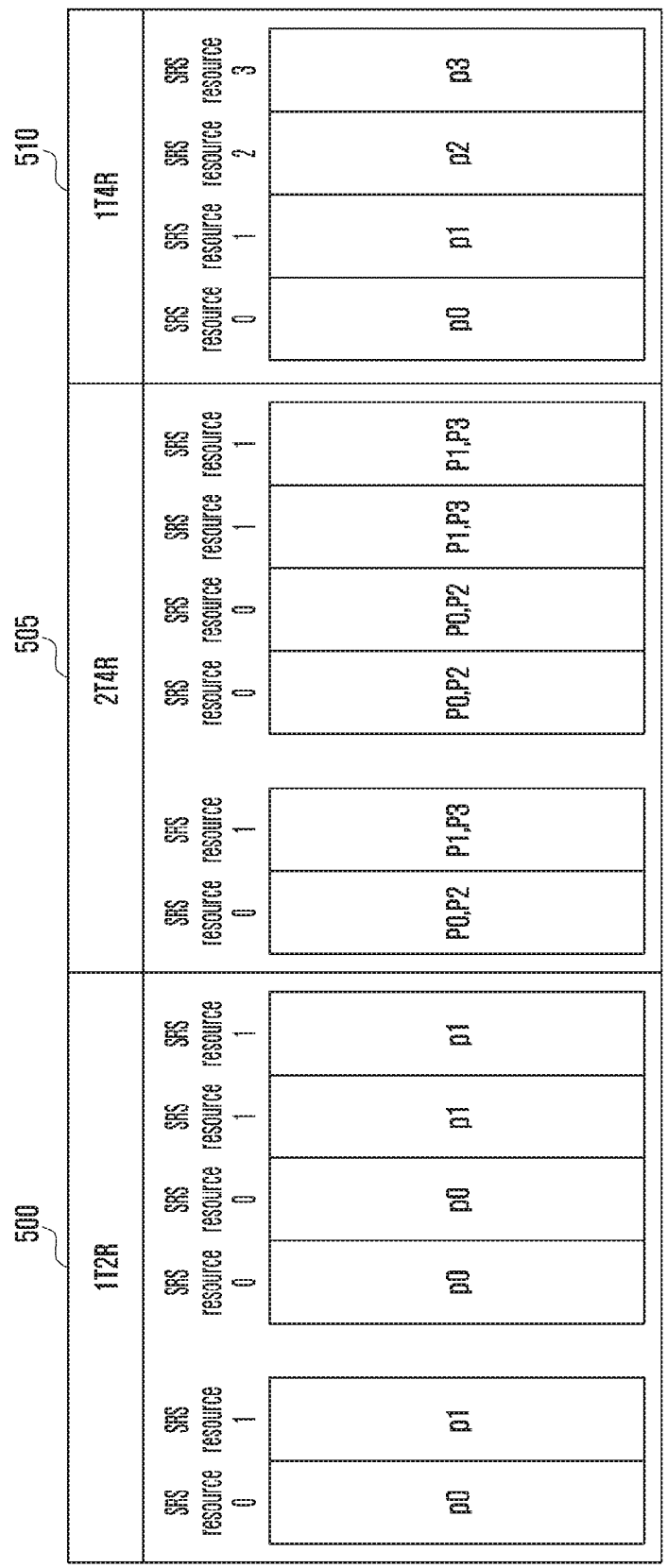
FIG. 5 illustrates various examples of supporting SRS antenna switching according to various embodiments of the disclosure.

FIG. 5 illustrates various examples of supporting SRS antenna switching according to various embodiments of the disclosure.

In a 5G or NR system, not only are various numerologies supported, but also, in SRS transmission, multiple SRS transmission OFDM symbols and repetitive transmission factors (repetition factors) are supported. Accordingly, in consideration thereof, SRS transmission needs to be counted. Counting SRS transmission may be variously utilized. For example, counting SRS transmission may be utilized to support antenna switching according to SRS transmission. Specifically, in which SRS transmission point of time an SRS is transmitted, to which antenna the SRS corresponds, and in which band the SRS is transmitted may be determined by SRS transmission counting. In NR, as illustrated in FIG. 5, SRS antenna switching for 1Tx (in the case of UE with 1T2R, 500), 2Tx (in the case of UE with 2T4R, 505), and 4Tx (in the case of UE with 1T4R, 510) is supported.

For example, in the case of 1Tx switching 500, a base station configures two 1 symbol SRS resources in two symbols so as to allow a first SRS port and a second SRS port to be transmitted respectively, or configures two 2 symbol SRS resources in four symbols so as to allow a first SRS port and a second SRS port to be transmitted respectively.

For example, in the case of 2Tx switching 505, a base station configures two 1 symbol SRS resources in two symbols such that first and third SRS ports are transmitted to a first SRS resource and second and fourth SRS ports are transmitted to a second SRS resource. Otherwise, in the case of 2Tx switching 505, a base station configures two 2 symbol SRS resources in four symbols such that first and third SRS ports are transmitted to a first SRS resource and second and fourth SRS ports are transmitted to a second SRS resource.

For example, in the case of 4Tx switching 510, SRS repetition (that is, transmission of the same SRS port in two or more symbols) is not supported, and a base station configures four 1 symbol SRS resources in four symbols such that first to fourth SRS ports are transmitted to SRS resources, respectively.

In NR, a base station and a terminal may acquire downlink channel state information, based on a CSI-RS other than an SRS. Each CSI-RS resource configuration configured by a higher layer includes at least the following pieces of detailed configuration information.

NZP (non-zero power)-CSI-RS-Resource ConfigID: ID of corresponding CSI-RS resource configurations NrofPorts: the number of CSI-RS ports included in a corresponding CSI-RS resource CSI-RS-timeConfig: a transmission cycle and a slot offset of a corresponding CSI-RS resource CSI-RS-ResourceMapping: an inner-slot OFDM symbol position and an inner-PRB subcarrier position of a corresponding CSI-RS resource CSI-RS-Density: frequency density of a corresponding CSI-RS CDMType: a CDM length and a CDM RE pattern of a corresponding CSI-RS CSI-RS-FreqBand: a transmission bandwidth and a starting point of a CSI-RS Pc: the ratio between PDSCH EPRE (energy per RE) and NZP CSI-RS EPRE Pc-SS: the ratio between SS/PBCH block EPRE and NZP CSI-RS EPRE CSI-RS-ResourceRep: NZP CSI-RS resources included in one resource set are connected to each other.

For example, if CSI-RS-ResourceRep is "ON", a terminal may identify that the same spatial domain transmission filters are applied to all NZP CSI-RS resources included in the resource set (that is, the terminal may presume that a base station has used an identical transmission beam), and that the NZP CSI-RS resources have the same number of CSI-RS ports and periodicity.

In addition, if CSI-RS-ResourceRep is "OFF", a terminal may not presume that the same spatial domain transmission filters are applied to all NZP CSI-RS resources included in the resource set (that is, the terminal may not presume that a base station has used an identical transmission beam), and may not identify that the NZP CSI-RS resources have the same number of CSI-RS ports and periodicity.

In NR, one CSI-RS port number from {1, 2, 4, 8, 12, 16, 24, 32} may be configured in one CSI-RS resource, and different degrees of freedom for configuration are supported according to the number of CSI-RS ports configured in a CSI-RS resource. Table 4 shows CSI-RS density which may be configured according to the number of NR CSI-RS ports, the number (N) of CSI-RS OFDM symbols, the number (Y) of frequency axis REs of a CSI-RS component RE pattern, the number (Z) of time axis REs, and a CDM length and type. Here, a CSI-RS component RE pattern is a basic unit for constituting a CSI-RS resource, and is composed of a total of Y×Z number of REs, which are Y number of adjacent REs on a frequency axis and Z number of adjacent REs on a time axis.

Referring to table 4, in NR, different degrees of freedom for frequency axis configuration are supported according to the number of CSI-RS ports configured in a CSI-RS resource.

Figure 6:
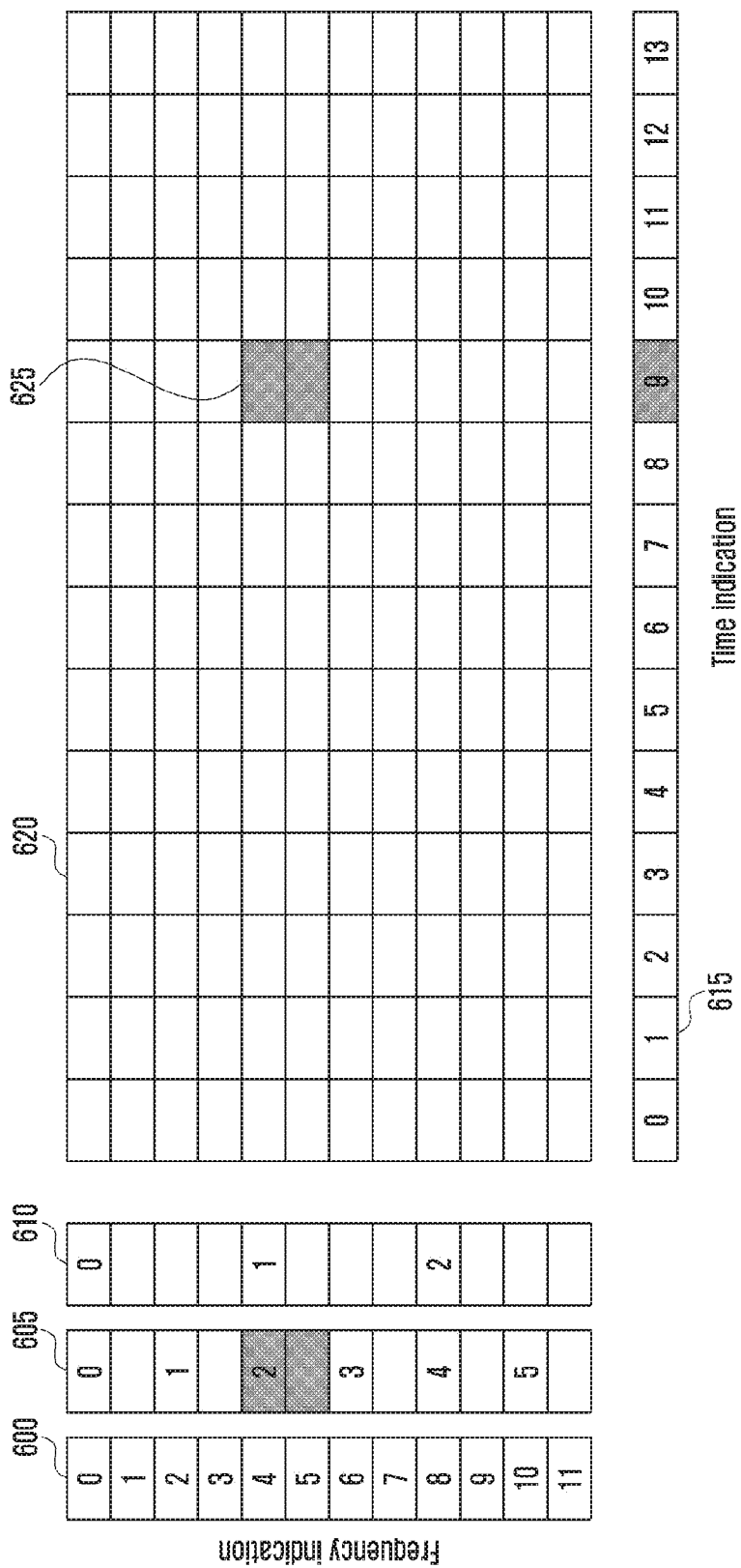
FIG. 6 illustrates various examples of designating a resource element (CSI-RS RE) of a channel state information reference signal, based on channel state information reference signal resource mapping information (CSI-RS-Resource Mapping) configured by a higher layer according to various embodiments of the disclosure.

For example, when there is one port, configuration is possible without limitation to a subcarrier in a PRB, and a CSI-RS RE position is designated by a bitmap of 12 bits (600 of FIG. 6).

When a port number satisfies {2, 4, 8, 12, 16, 24, 32} and Y=2, configuration is possible every two subcarriers in a PRB, and a CSI-RS RE position is designated by a bitmap of 6 bits (605 of FIG. 6). When there are four ports and Y=4, configuration is possible every four subcarriers in a PRB, and a CSI-RS RE position is designated by a bitmap of 3 bits (610 of FIG. 6). Similarly, a time axis RE position may be designated by a bitmap of a total of 14 bits. Here, according to a Z value of table 4, the length of a bitmap may be changed together with the designation of a frequency position, and the principles thereof are similar to those described above, and thus a detailed description thereof will be omitted.

TABLE 4

Parameter for NR CSI-RS

| X | Density [RE/RB/port] | N | (Y, Z) | CDM |
|---|---|---|---|---|
| 1 | 3, 1, ½ | 1 | N.A. | No CDM |
| 2 | 1, ½ | 1 | (2, 1) | FD-CDM2 |
| 4 | 1 | 2 | (2, 2) | FD-CDM2 |
| 4 | 1 | 1 | (4, 1) | FD-CDM2 |
| 8 | 1 | 1 | (2, 1) | FD-CDM2 |
| 8 | 1 | 2 | (2, 2) | FD-CDM2, CDM4 (FD2, TD2) |
| 12 | 1 | 1 | (2, 1) | FD-CDM2 |
| 12 | 1 | 2 | (2, 2) | CDM4 (FD2, TD2) |
| 16 | 1, ½ | 2 | (2, 2) | FD-CDM2, CDM4 (FD2, TD2) |
| 24 | 1, ½ | 4 | (2, 2) | FD-CDM2, CDM4 (FD2,TD2), CDM8 (FD2, TD4) |
| 32 | 1, ½ | 4 | (2, 2) | FD-CDM2, CDM4 (FD2,TD2), CDM8 (FD2, TD4) |

FIG. 6 illustrates various examples of designating a resource element (CSI-RS RE) of a channel state information reference signal, based on channel state information reference signal resource mapping information (CSI-RS-Resource Mapping) configured by a higher layer according to various embodiments of the disclosure.

As illustrated in FIG. 6, when configuration is made to satisfy X=2 port, a base station designates a frequency axis RE position by 605. If a frequency axis subcarrier position is designated by 2 of 605 and a time axis OFDM symbol position is designated by 9 of 615, a terminal may identify, based on thereof, that a CSI-RS is transmitted from an RE position of 625 in a corresponding PRB 620.

In the case of an LTE/LTE-A system, simple linear precoding (LP) such as that performed by a matched filter (MF) precoder, a zero-forcing (ZF) precoder, a minimum mean square error (MMSE) precoder has been usually assumed in consideration of complexity of a base station and a terminal, and a linear receiver such as an MMSE receiver or an MMSE-successive interference cancelation (SIC) receiver has also been assumed in a terminal. A linear precoder/receiver has low complexity, but has a disadvantage in that optimal performance cannot be ensured because an interference control capability is incomplete.

In the case of an NR system, the complexity supportable by a base station and a terminal increases, and thus the application of non-linear precoding (NLP) and nonlinear receivers having more outstanding interference control capabilities is being discussed. Compared to linear precoding, nonlinear precoding promises a great performance advantage by means of a technique of acquiring performance identical or similar to that acquired when there is no interference at a reception end by performing transmission after canceling interference at a transmission end in advance. However, nonlinear precoding requires an additional operation such as a modulo operation at a transmission/reception end, and requires accurate channel estimation.

Figure 7:
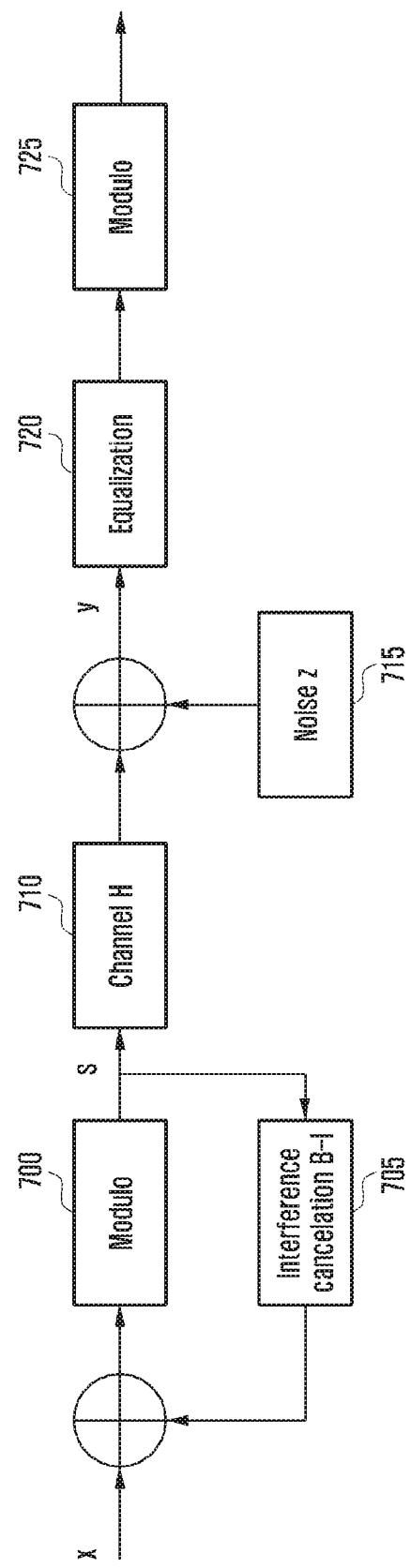
FIG. 7 illustrates a block diagram relating to Tomlinson-Harashima precoding (THP), which is an example of nonlinear precoding according to various embodiments of the disclosure.

FIG. 7 illustrates a block diagram relating to Tomlinson-Harashima precoding (THP), which is an example of non-linear precoding according to various embodiments of the disclosure.

Referring to FIG. 7, a base station applies (700) a modulo operation to a transmission symbol x after canceling (705) interference in advance and thus produces a transmission signal s. As in equation 1 below, a terminal receives a reception signal y having passed through a channel 710 and noise 715.

$$y = Hs + z = Q^H Ls + z \quad \text{[Equation 1]}$$

In equation 1, it has been assumed that a channel H may be decomposed as $Q^H L$ via QR decomposition. A terminal may equalize (720) a subsequently received signal y by an equalizer and receive a transmission symbol x via a modulo operation 725.

Figure 8:
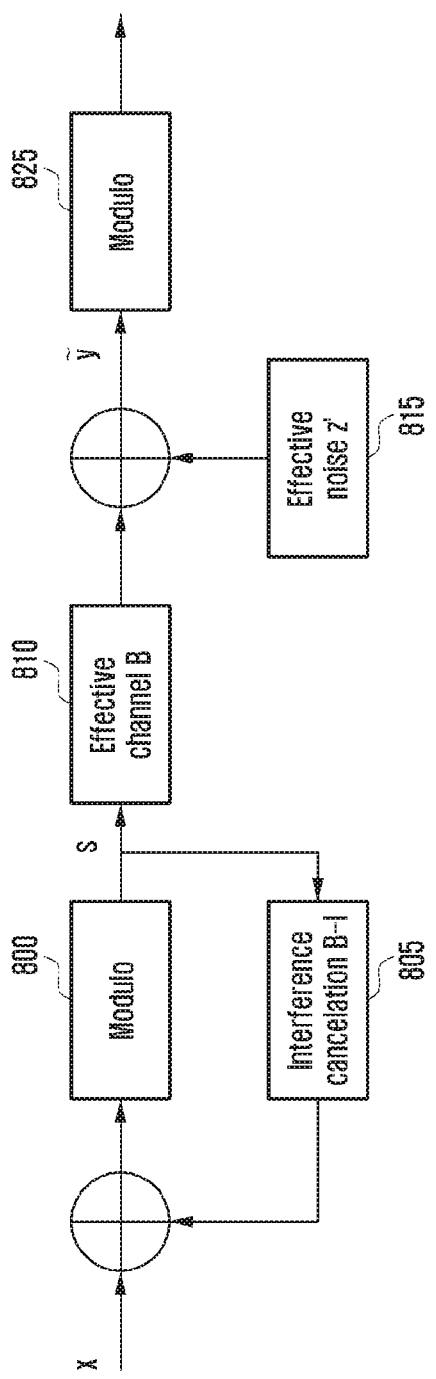
FIG. 8 illustrates the drawing of FIG. 7.

When it is assumed that an equalizer 720 of a terminal is ΓQ, the block diagram of FIG. 7 may be simplified as in FIG. 8. Here, Γ, as a reciprocal number of a diagonal component of L, satisfies equation 2.

$$\Gamma = \text{diag}(1/l_{11}, \ldots, 1/l_{kk}) \quad \text{[Equation 2]}$$

Referring to FIG. 8, transmission- and reception-end module operations 800, 825 and interference cancelation 805 are the same as in FIG. 7, but an effective channel B may be theoretically described using equation 3.

$$B = \Gamma Q H = \Gamma Q Q^H L = \Gamma L \quad \text{[Equation 3]}$$

Therefore, a terminal acquires, as an input to a modulo operation, a signal as in equation 4 below.

$$\tilde{y} = \Gamma Q(y) = \Gamma Q(Hs + z) = \Gamma Q(Q^H Ls + z) \quad \text{[Equation 4]}$$
$$= \Gamma Ls + \Gamma Qz = Bs + \tilde{z}$$

Equation 4 is equivalent to the equation illustrated in FIG. 16, and referring to FIG. 16, a terminal may identify that a signal in which interference is canceled is received according to the structures of FIGS. 7 and 8.

As discussed above, nonlinear precoding may allow a terminal in an interference environment to acquire performance similar to that in a non-interference environment, but to this end, an additional base station and terminal operation and elaborate channel estimation are essential.

Various embodiments of the disclosure may provide a method for supporting a signaling for nonlinear precoding and methods for configuring reference signals, such as a CSI-RS, an SRS, and a DMRS, for elaborate channel estimation.

Hereinafter, a description will be made, based on the example of a 5G or NR system, but embodiments of the disclosure may be applied to other communication systems having similar technical backgrounds or channel types. Accordingly, embodiments of the disclosure may be applied to other communication systems via partial variation within a range that does not greatly depart from the range of the disclosure, based on a determination by those skilled in the art.

As used herein, terms "physical channel" and "signal" in a conventional LTE or LTE-A system may be used to explain the proposed method and apparatus. However, the description of the disclosure may be applied to any wireless communication system other than an LTE or LTE-A system.

The description of the disclosure may be applied to an FDD system and a TDD system.

As used herein, a physical layer signaling refers to a signal transmission method in which a signal is transmitted from a base station to a terminal by using a downlink control channel of a physical layer or in which a signal is transmitted from a terminal to a base station by using an uplink control channel of a physical layer, and may also be referred to as an L signaling or a PHY signaling.

As used herein, a higher signaling or a higher layer signaling refers to a signal transmission method in which a signal is transmitted from a base station to a terminal by using a downlink data channel of a physical layer or in which a signal is transmitted from a terminal to a base station by using an uplink data channel of a physical layer, and may also be referred to as RRC signaling, L2 signaling, PDCP signaling, or an MAC control element (MAC CE).

As used herein, uplink (UL) DCI or uplink related (UL-related) DCI means a physical layer control signaling (L1 control) including pieces of information needed for uplink transmission, such as uplink resource configuration information such as uplink grant (UL grant), resource configuration type information, uplink power control information, cyclic shift or orthogonal cover codes (OCC) of uplink reference signals, a channel state information (CSI) request, an SRS request, codeword-specific MCS information, and an uplink precoding information field.

Embodiment 1: NLP Procedure for TDD System and FDD System

As described above, compared to linear precoding (LP) nonlinear precoding (NLP) may provide an excellent data transmission rate, but requires an additional operation such as a modulo operation in a terminal. Accordingly, indiscriminately performing NLP may burden specifically low-price terminals, and it is required to support a terminal capability (UE capability) signaling about whether or not NLP is to be performed. Accordingly, a terminal may report, to a base station, the impossibility of supporting NLP (that is, the impossibility of applying a modulo operation at the time of reception) or the possibility of supporting NLP (that is, the possibility of applying a modulo operation at the time of reception).

To terminals having reported the possibility of NLP application via the NLP UE capability signaling, a base station may provide notification, via a higher layer signaling such as an RRC signaling or an MAC CE signaling, as to whether or not NLP is applied. As another method, via a higher layer signaling, a base station may notify the terminals of the possibility of NLP application, and may indicate, via an L signaling (a physical layer signaling such as DCI), to the terminals as to whether or not NLP is applied to a PDSCH assigned by the corresponding L1 signaling. In another example, it is possible to designate the application of NLP a specific period of time after a point of time at which the MAC CE signaling or the L1 signaling indicates whether or not NLP is applied. This serves to provide a time for changing transmission/reception modes of a base station and a terminal.

If a base station requires application of NLP to a PDCCH other than a PDSCH, it is possible to provide notification, via higher layer signaling, as to whether or not NLP is applied to PDCCH, wherein an NLP-applied signaling for a PDCCH and an NLP-applied signaling for a PDSCH may be composed of independent parameters. Applying NLP to a PDCCH may be indicated by L1 signaling, wherein the L1 signaling should be designated by a PDCCH transmitted a specific period of time before a point of time at which another PDCCH, to which the NLP is to be applied, is transmitted.

Figure 9A:
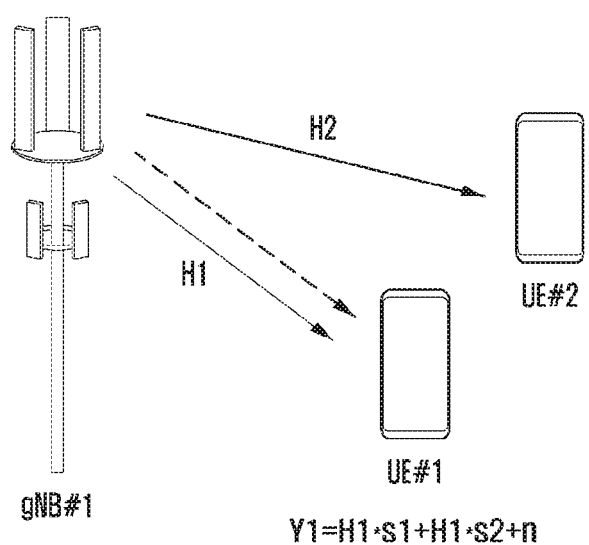
FIG. 9A illustrates structures of a terminal and a base station for applying nonlinear precoding (NLP) between terminals existing in an identical cell (an identical transmission/reception point, TRP) or an identical beam in a frequency division duplexing (FDD) system, based on signaling according to various embodiments of the disclosure.
Figure 9B:
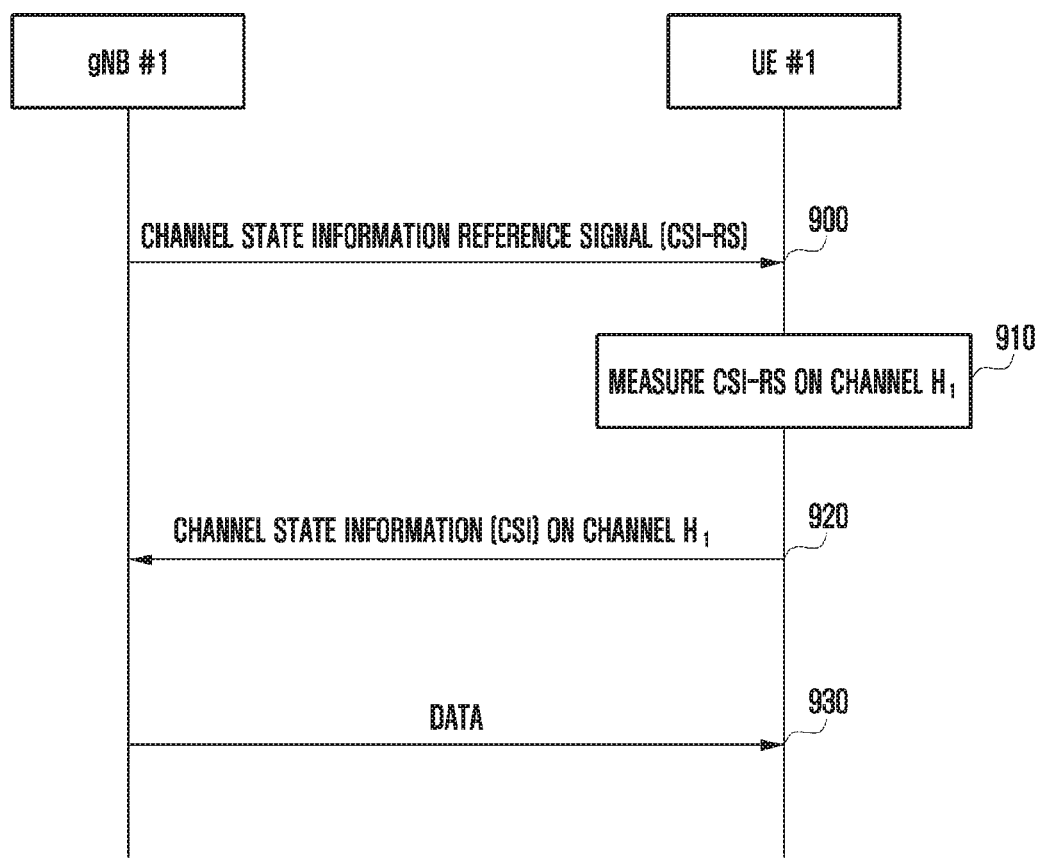
FIG. 9B illustrates operations of a terminal and a base station for applying nonlinear precoding (NLP) between terminals existing in an identical cell (an identical transmission/reception point, TRP) or an identical beam in a frequency division duplexing (FDD) system, based on signaling according to various embodiments of the disclosure.

FIGS. 9A and 9B are views illustrating structures and operations of a terminal and a base station for applying nonlinear precoding (NLP) between terminals existing in an identical cell (an identical transmission/reception point, TRP) or an identical beam in a frequency division duplexing (FDD) system, based on signaling according to various embodiments of the disclosure.

In the case of an FDD system, since channel reciprocity is not usually established, a terminal measures a channel with a downlink reference signal and reports to a base station about the measured channel, and thus the base station may acquire channel information.

FIG. 9A illustrates structures of a terminal and a base station for applying nonlinear precoding (NLP) between terminals existing in an identical cell (an identical transmission/reception point, TRP) or an identical beam in a frequency division duplexing (FDD) system, based on signaling according to various embodiments of the disclosure.

Referring to the description of the above-described NLP and FIG. 9A, in order to apply NLP to a terminal UE #1, a base station gNB #1 needs to identify channel information H, a transmission sequence s1, and an interference sequence s2. In this case, both a target sequence s1 and an interference sequence s2 are transmitted in an identical cell (or an identical TRP or an identical beam), and thus a base station needs to acquire information on a channel H1.

To this end, as illustrated in FIG. 9B, a signaling between a terminal and a base station is required.

FIG. 9B illustrates operations of a terminal and a base station for applying nonlinear precoding (NLP) between terminals existing in an identical cell (an identical transmission/reception point, TRP) or an identical beam in a frequency division duplexing (FDD) system, based on signaling according to various embodiments of the disclosure.

As illustrated in FIG. 9B, a base station gNB #1 firstly transmits a CSI-RS to a terminal UE #1 (operation 900). The terminal UE #1 measures the CSI-RS and produces CSI on the basis thereof (operation 910). The terminal UE #1 reports the produced CSI to the base station gNB #1 (operation 920). Then, the base station gNB #1 applies NLP and transmits data to the terminal UE #1 (operation 930).

Figure 10A:
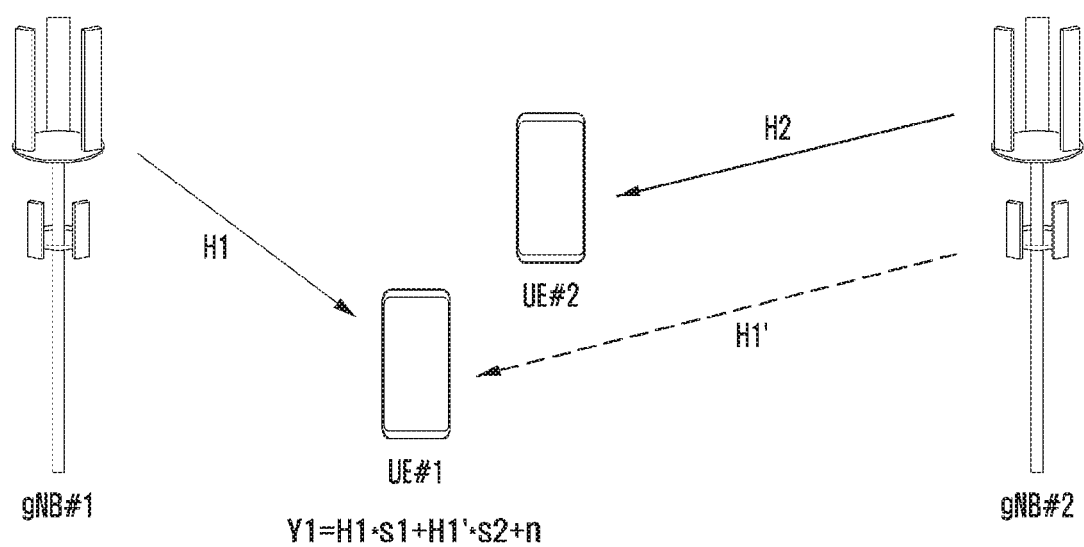
FIG. 10A illustrates structures of a terminal and a base station for applying NLP between terminals existing in cells different from each other (different TRPs or different beams) in an FDD system, based on signaling according to various embodiments of the disclosure.
Figure 10B:
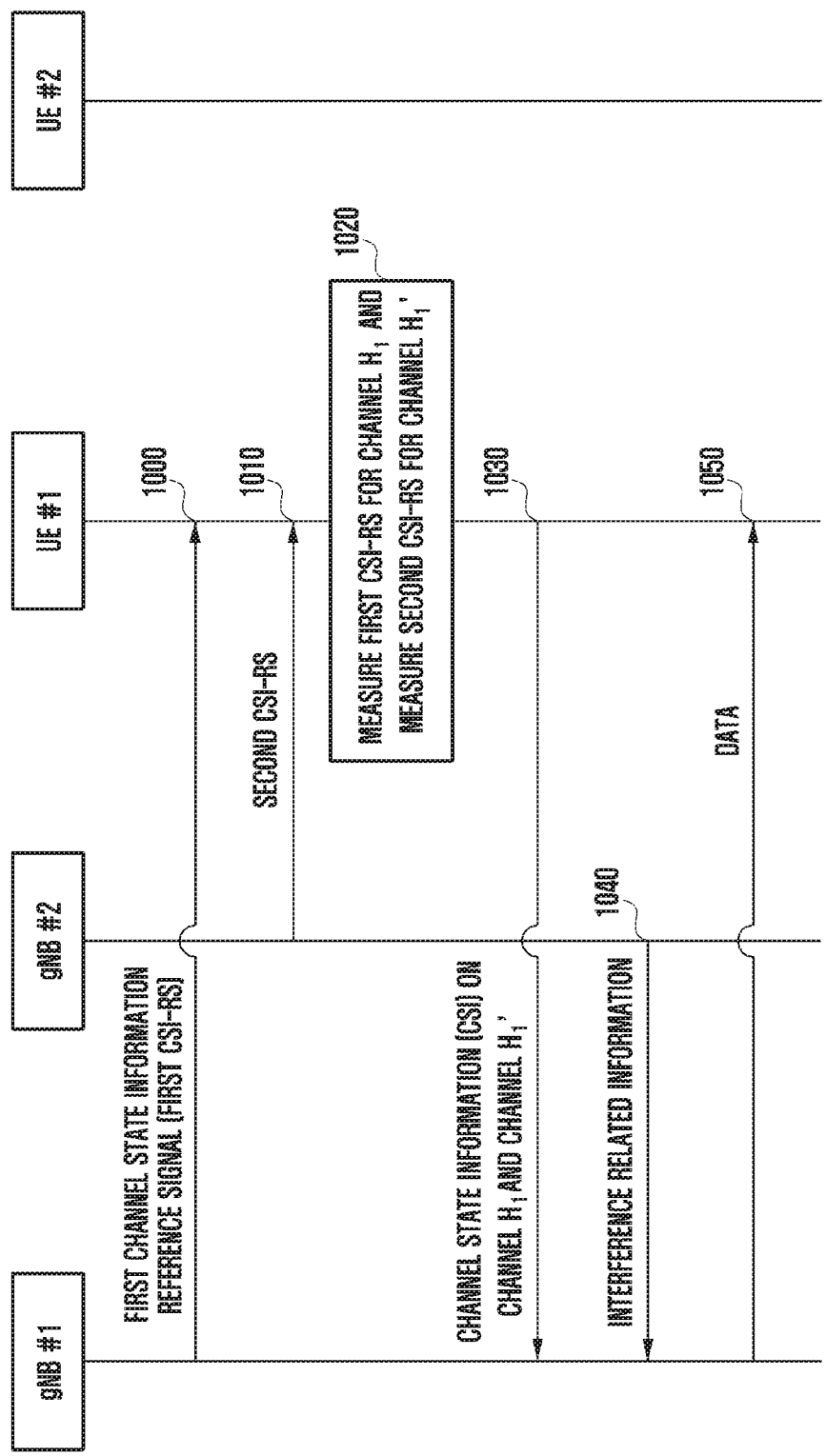
FIG. 10B illustrates operations of a terminal and a base station for applying NLP between terminals existing in cells different from each other (different TRPs or different beams) in an FDD system, based on signaling according to various embodiments of the disclosure.

FIGS. 10A and 10B are views illustrating structures and operations of a terminal and a base station for applying NLP between terminals existing in cells different from each other (different TRPs or different beams) in an FDD system, based on signaling according to various embodiments of the disclosure.

In the case of an FDD system, since channel reciprocity is not usually established, a terminal measures a channel with a downlink reference signal and reports to a base station about the measured channel, and thus the base station may acquire channel information.

FIG. 10A illustrates structures of a terminal and a base station for applying NLP between terminals existing in cells different from each other (different TRPs or different beams) in an FDD system, based on signaling according to various embodiments of the disclosure.

Referring to the description of the above-described NLP and FIG. 10A, in order to apply NLP to a terminal UE #1, a base station gNB #1 needs to identify channel information H, a transmission sequence s1, and an interference sequence s2. In this case, a target sequence s1 and an interference sequence s2 are transmitted in cells different from each other (different TRPs or different beams), and thus a base station needs to acquire information on both channels H1 and H1'.

To this end, as illustrated in FIG. 10B, a signaling between a terminal and a base station is required.

FIG. 10B illustrates operations of a terminal and a base station for applying NLP between terminals existing in cells different from each other (different TRPs or different beams) in an FDD system, based on signaling according to various embodiments of the disclosure.

As illustrated in FIG. JOB, base stations gNB #1 and gNB #2 firstly transmit CSI-RSs to a terminal UE #1, respectively (operations 1000 and 1010). The terminal UE #1 measures the CSI-RSs and produces CSI on the basis thereof (operation 1120). The terminal UE #1 reports the produced CSI to the base station(s) gNB #1 or gNB #1 and gNB #2 (operation 1030). Then, the base station gNB #1 receives transmitted information on an interference sequence s2 from gNB #2 (operation 1040). The base station gNB #1 applies NLP and transmits data to the terminal UE #1 (operation 1050).

Figure 11A:
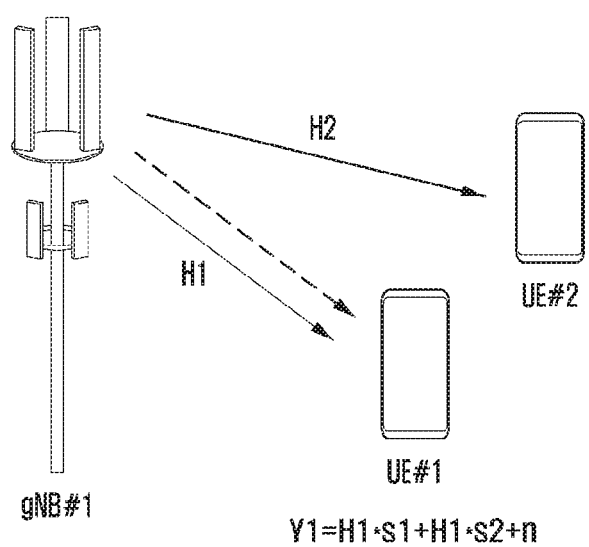
FIG. 11A illustrates structures of a terminal and a base station for applying NLP between terminals existing in an identical cell (an identical TRP or an identical beam) in a TDD system, based on signaling according to various embodiments of the disclosure.
Figure 11B:
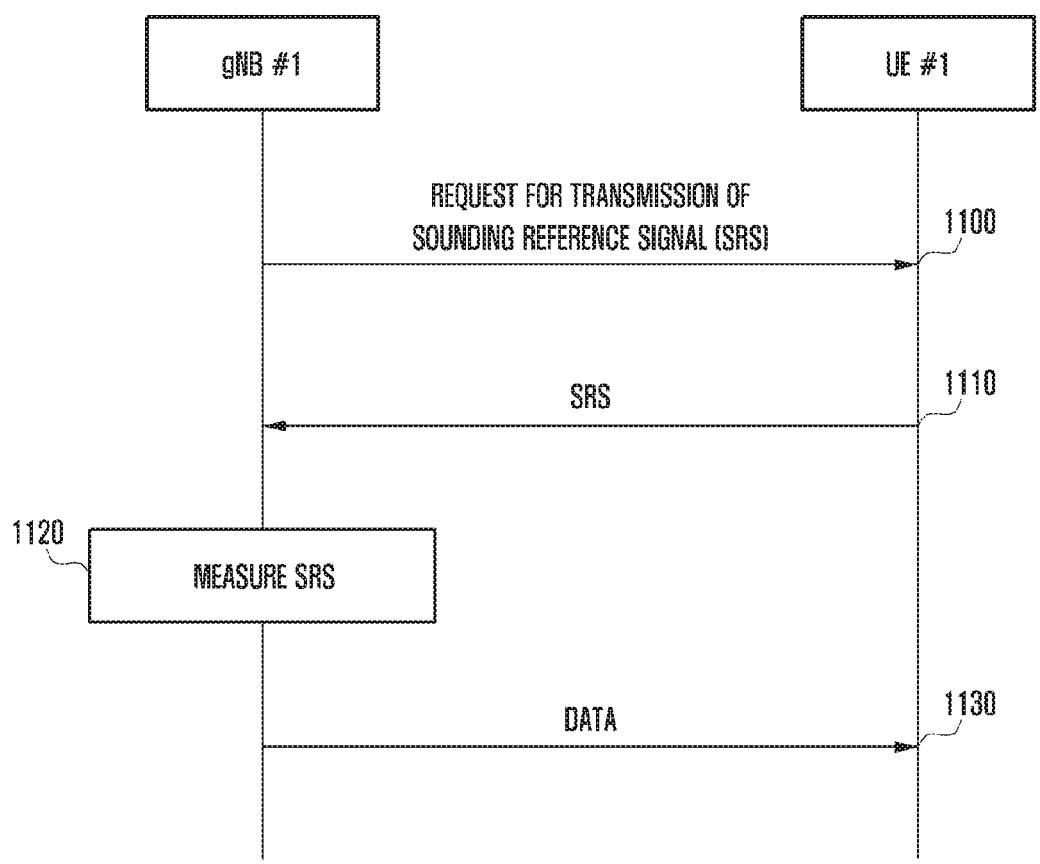
FIG. 11B illustrates operations of a terminal and a base station for applying NLP between terminals existing in an identical cell (an identical TRP or an identical beam) in a TDD system, based on signaling according to various embodiments of the disclosure.

FIGS. 11a and 11b are views illustrating structures and operations of a terminal and a base station for applying NLP between terminals existing in an identical cell (an identical TRP or an identical beam) in a time division duplexing (TDD) system, based on signaling according to various embodiments of the disclosure.

In the case of TDD, it is possible to directly measure, in a base station, a downlink channel with an uplink reference signal by using channel reciprocity.

FIG. 11A illustrates structures of a terminal and a base station for applying NLP between terminals existing in an identical cell (an identical TRP or an identical beam) in a TDD system, based on signaling according to various embodiments of the disclosure.

Referring to the description of the above-described NLP and FIG. 11A, in order to apply NLP to a terminal UE #1, a base station gNB #1 needs to identify channel information H, a transmission sequence s1, and an interference sequence s2. In this case, both a target sequence s1 and an interference sequence s2 are transmitted in an identical cell (or an identical TRP or an identical beam), and thus a base station needs to acquire information on a channel H1.

To this end, as illustrated in FIG. 11B, a signaling between a terminal and a base station is required.

FIG. 11B illustrates operations of a terminal and a base station for applying NLP between terminals existing in an identical cell (an identical TRP or an identical beam) in a TDD system, based on signaling according to various embodiments of the disclosure.

As illustrated in FIG. 11B, a base station gNB #1 firstly indicates SRS transmission to a terminal UE #1 (operation 1100). The terminal UE #1 receives the indication and transmits an SRS to the base station gNB #1 (operation 1110). The base station gNB #1 estimates a channel by measuring the SRS (operation 1120). Then, the base station gNB #1 applies NLP and transmits data to the terminal UE #1 (operation 1130).

Figure 12A:
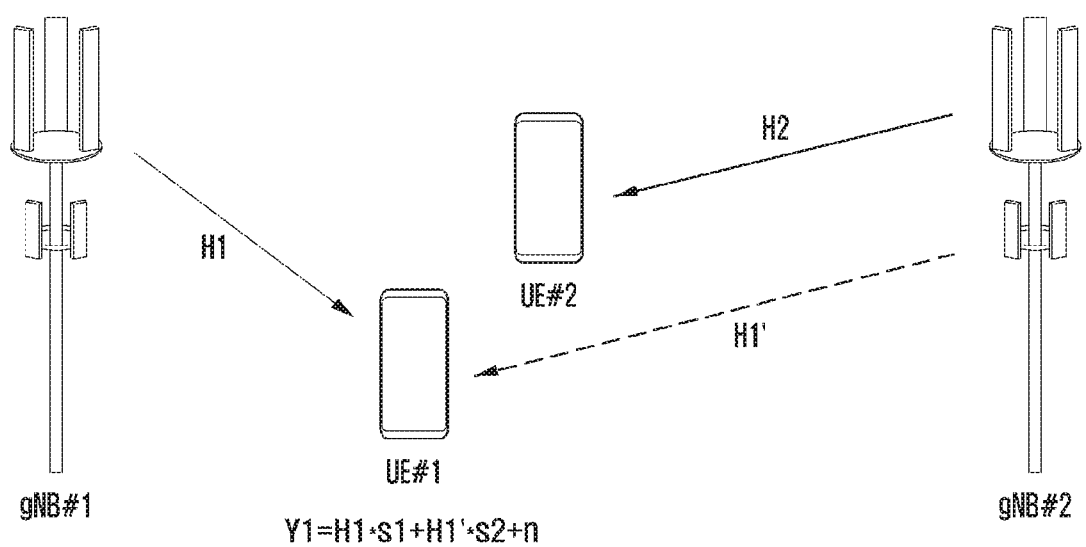
FIG. 12A illustrates structures of a terminal and a base station for applying NLP between terminals existing in cells different from each other (different TRPs or different beams) in a time division duplexing (TDD) system, based on the signaling according to various embodiments of the disclosure.

FIGS. 12A and 12B are views illustrating structures and operations of a terminal and a base station for applying NLP between terminals existing in cells different from each other (different TRPs or different beams) in a time division duplexing (TDD) system, based on the signaling according to various embodiments of the disclosure.

In the case of TDD, it is possible to directly measure, in a base station, a downlink channel with an uplink reference signal by using channel reciprocity.

FIG. 12A illustrates structures of a terminal and a base station for applying NLP between terminals existing in cells different from each other (different TRPs or different beams) in a time division duplexing (TDD) system, based on the signaling according to various embodiments of the disclosure.

Referring to the description of the above-described NLP and FIG. 12A, in order to apply NLP to a terminal UE #1, a base station gNB #1 needs to identify channel information H1, interference channel information H1', a transmission sequence s1, and an interference sequence s2. In this case, a target sequence s1 and an interference sequence s2 are transmitted in cells different from each other (different TRPs or different beams), and thus a base station needs to acquire both information on a target channel H1 and information on an interference channel H1'.

To this end, as illustrated in FIG. 12b, a signaling between a terminal and a base station is required.

FIG. 12B illustrates operations of a terminal and a base station for applying NLP between terminals existing in cells different from each other (different TRPs or different beams) in a time division duplexing (TDD) system, based on the signaling according to various embodiments of the disclosure.

As illustrated in FIG. 12B, a base station gNB #1 firstly indicates SRS transmission to a terminal UE #1 (operation 1200). The terminal UE #1 receives the indication and transmits an SRS (operation 1210). At this time, both the base station gNB #1 and a base station gNB #2 need to estimate a channel by measuring the SRS (operations 1220 and 1230). Then, the base station gNB #1 receives transmitted information on an interference sequence s2 and an interference channel H1' from gNB #2 (operation 1240). The base station gNB #1 applies NLP and transmits data to the terminal UE #1 (operation 1250).

Embodiment 2: Method for Configuring SRS for NLP

As described above, in NR, three SRS transmission types, namely periodic transmission, semi-persistent transmission, and aperiodic transmission, are supported. As described in example 1, an SRS of one terminal needs to be simultaneously received from various cells or TRPs so as to apply NLP. If simultaneous SRS reception using various cells or TRPs is performed by an aperiodic SRS, the probability of the aperiodic SRS colliding with a periodic SRS or a semi-persistent SRS in another cell or another TRP increases. To avoid this, the following countermeasures may be considered (method 1-x).

Method 1-1 (a 1 bit signaling for transmission omission of an SRS resource level with respect to a periodic SRS or a semi-persistent SRS): As described above, a base station may indicate transmission omission with respect to a periodic SRS or a semi-persistent SRS so as to facilitate aperiodic SRS reception. Considering a signaling overhead therefor, SRS resource level transmission omission in a specific slot may be indicated via 1 bit signaling. When a terminal receives indication of SRS transmission omission by the signaling, transmission of all SRS resources transmitted to one or more OFDM/SC-FDMA symbols in a slot (or a subframe) indicated by a corresponding indicator is omitted. The slot indicated by a corresponding indicator may be an uplink slot which is spaced a predesignated offset $K \geq 0$ apart from a slot for transmitting DCI including the corresponding indicator. The 1 bit SRS transmission omission signaling may be indicated via UE-specific DCI, and may also be transmitted to a control channel, such as group-common DCI, shared by a specific terminal group, so as to improve signaling efficiency. If the signaling is performed by group-common DCI, 1) one 1 bit signaling may be applied to all terminals or 2) a 1 bit signaling may be individually supported for each terminal or for each group such that omission or non-omission may be indicated differently.

Method 1-2 (an N bit signaling for transmission omission of an OFDM symbol level with respect to a periodic SRS or a semi-persistent SRS): As described above, a base station may indicate transmission omission with respect to a periodic SRS or a semi-persistent SRS so as to facilitate aperiodic SRS reception. In order to increase the degree of signaling freedom of method 1-1, OFDM/SC-FDMA symbol level SRS transmission omission may be indicated via an N bit signaling. As an example, the N bit signaling may equally divide, by N, SS resources composed of M number of OFDM/SC-FDMA symbols and designate notification as to whether or not to omit SRS transmission with respect to each divided part. For example, when a part of the N bit signaling is 0 and another part of the N bit signaling is 1 (0 (or 1) is SRS transmission and 1 (or 0) is SRS transmission omission), a terminal omits SRS transmission in a slot (or a subframe) indicated by a corresponding indicator with respect to a part indicated to omit SRS transmission, that is, an SRS symbol indicated by the indicator and represented by 1. The slot indicated by a corresponding indicator may be an uplink slot which is spaced a predesignated offset $K \geq 0$ apart from a slot for transmitting DCI including the corresponding indicator. As an example, via a 2 bit signaling, a base station may indicate, to a terminal, a symbol from which SRS transmission is to be omitted, the symbol being selected from among a maximum of four SRS symbols. The N bit SRS transmission omission signaling may be indicated via UE-specific DCI, and may also be transmitted to a control channel, such as group-common DCI, shared by a specific terminal group, so as to improve signaling efficiency. If the signaling is performed by group-common DCI, 1) one N bit signaling may be applied to all terminals or 2) an N bit signaling may be individually supported for each terminal or for each group such that omission or non-omission may be indicated differently.

Method 1-3 (an N bit signaling for UL channel/RS transmission omission): As described above, a base station may indicate transmission omission with respect to all UL channels or RSs so as to facilitate aperiodic SRS reception. A base station may indicate OFDM/SC-FDMA symbol level UL channel/RS transmission omission via a signaling of at least one bit. As an example, the N bit signaling may equally divide, by N, UL channels or RSs composed of M number of OFDM/SC-FDMA symbols and designate notification as to whether or not to omit SRS transmission with respect to each divided part. When a terminal receives indication of UL channel/RS transmission omission by the signaling, transmission with respect to a part of UL channels/RSs transmitted to one or more OFDM/SC-FDMA symbols in a slot (or a subframe) indicated by a corresponding indicator is omitted. The slot indicated by a corresponding indicator may be an uplink slot which is spaced a predesignated offset K≥0 apart from a slot for transmitting DCI including the corresponding indicator. As an example, via a 3 bit signaling, a base station may indicate, to a terminal, a symbol from which SRS transmission is to be omitted, the symbol being selected from among symbols from an eighth symbol to a thirteenth symbol. The N bit UL channel/RS transmission omission signaling may be indicated via UE-specific DCI, and may also be transmitted to a control channel, such as group-common DCI, shared by a specific terminal group, so as to improve signaling efficiency. If the signaling is performed by group-common DCI, 1) one N bit signaling may be applied to all terminals or 2) an N bit signaling may be individually supported for each terminal or for each group such that omission or non-omission may be indicated differently.

Method 1-4 (an implicit signaling based on an NLP-On/Off signaling): In methods 1-1 to 1-3 above, it has been described that SRS transmission omission or UL channel/RS transmission omission is indicated via a separate signaling. However, application in practice is not limited thereto, and indication in joint encoding with an NLP-applied indicator (an NLP-On/Off signaling) of example 1 above is possible. As an example, a base station may provide, to each of terminals, indication of applying NLP in a specific slot or subframe, and terminals may omit transmission with respect to a periodic SRS or a semi-persistent SRS in a corresponding slot. In addition, various other enhancements are possible, but a detailed description thereof will be omitted.

Other than the function of omitting transmission with respect to an SRS or other UL channels/RSs, another function needed for SRS transmission considering NLP is an alignment function with respect to an SRS frequency hopping pattern. As described above, in NR, an SRS frequency hopping function for various bandwidth part (BWP) and carrier component (CC) configuration is provided.

A terminal determines an accurate SRS frequency hopping pattern by assuming SRS counters (nSRSs) different from each other according to higher layer configuration, and thus, even when a base station makes tree structure configuration parameters (BSRS or CRSR) for SRS frequency hopping coincide with each other, SRS hopping patterns may not coincide if terminal-specific nSRSs are different. Accordingly, there is a disadvantage in that improvement of channel estimation accuracy by terminal-specific SRS pattern matching and improvement of scheduling accuracy may not be expected. To solve this, the following SRS frequency hopping pattern matching methods may be used (method 2-y).

Method 2-1 (SRS counter initialization by a 1 bit signaling): As described above, a base station may indicate frequency hopping alignment with respect to a periodic SRS, a semi-persistent SRS, or an aperiodic SRS so as to improve channel estimation accuracy. Considering a signaling overhead therefor, frequency hopping initialization may be indicated via a 1 bit signaling. When a terminal receives indication of SRS frequency hopping initialization by the signaling, an SRS counter (nSRS) is initialized to a predesignated value (for example, 0) in a slot (or a subframe) indicated by a corresponding indicator. The 1 bit SRS frequency hopping initialization signaling may be indicated via UE-specific DCI, and may also be transmitted to a control channel, such as group-common DCI, shared by a specific terminal group, so as to improve signaling efficiency. If the signaling is performed by group-common DCI, 1) one 1 bit signaling may be applied to all terminals or 2) a 1 bit signaling may be individually supported for each terminal or for each group such that initialization or non-initialization may be indicated differently.

Method 2-2 (SRS counter indication by an N bit signaling): As described above, a base station may indicate frequency hopping alignment with respect to a periodic SRS, a semi-persistent SRS, or an aperiodic SRS so as to improve channel estimation accuracy. Considering the degree of configuration freedom therefor, a frequency hopping resource position (or an nSRS value) may be indicated via an N bit signaling. When a terminal receives indication for an SRS hopping resource position (or an nSRS value) by the signaling, an SRS counter (nSRS) is determined as one of predesignated values in a slot (or a subframe) indicated by a corresponding indicator. The N bit SRS frequency hopping resource position signaling may be indicated via UE-specific DCI, and may also be transmitted to a control channel, such as group-common DCI, shared by a specific terminal group, so as to improve signaling efficiency. If the signaling is performed by group-common DCI, 1) one 1 bit signaling may be applied to all terminals or 2) a 1 bit signaling may be individually supported for each terminal or for each group such that initialization or non-initialization may be indicated differently.

Method 2-3 (BWP/CC indication by an N bit signaling): As described above, a base station may indicate frequency hopping alignment with respect to a periodic SRS, a semi-persistent SRS, or an aperiodic SRS so as to improve channel estimation accuracy. Considering the degree of configuration freedom therefor, a frequency hopping resource position (BWP ID or CC ID) may be indicated via an N bit signaling. The N bit SRS frequency hopping resource position signaling may be indicated via UE-specific DCI, and may also be transmitted to a control channel, such as group-common DCI, shared by a specific terminal group, so as to improve signaling efficiency. If the signaling is performed by group-common DCI, 1) one 1 bit signaling may be applied to all terminals or 2) a 1 bit signaling may be individually supported for each terminal or for each group such that initialization or non-initialization may be indicated differently.

Method 2-4 (an implicit signaling based on an NLP-On/Off signaling): In methods 2-1 to 2-3 above, it has been described that an SRS frequency hopping resource position is indicated via a separate signaling. However, application in practice is not limited thereto, and indication in joint encoding with an NLP-applied indicator (an NLP-On/Off signaling) of example 1 above is possible. As an example, a base station may provide, to each of terminals, indication of applying NLP in a specific slot or subframe, and terminals may initialize an nSRS to a predesignated value in a corresponding slot. In addition, various other enhancements are possible, but a detailed description thereof will be omitted.

Methods 1-x to 2-y above have been described as performing signaling by independent parameters, respectively, for the convenience of explanation. However, application in practice is not limited thereto, and it will be obvious that signaling may be simultaneously performed by a single parameter about whether or not to apply 1) a function of canceling/omitting transmission with respect to an SRS or other UL channels/RSs and 2) a function of matching SRS frequency hopping patterns.

As an example, via a 1 bit L1 signaling, a base station may provide, to a terminal, indication of simultaneously applying or not applying 1) the function of canceling/omitting transmission with respect to an SRS or other UL channels/RSs and 2) the function of matching SRS frequency hopping patterns. A detailed description of expanding the functions with respect to a combination of other methods 1-x or 2-y will be omitted.

Embodiment 3: Method for Setting DMRS for NLP

Compared to LP, NLP may realize a performance advantage when there are many terminals. In consideration thereof, when a terminal is indicated as being capable of using NLP, it may be designated that a specific DMRS pattern is assumed in a corresponding slot or a corresponding subframe, for example, that a type II DMRS pattern (a maximum of twelve DMRS patterns are provided in one slot) is assumed. Here, when a corresponding slot has a length such that an additional DMRS may be assumed, a terminal may designate that an additional DMRS is assumed to always exist.

As another example, a base station uses two different sets of RRC parameters such that an RRC parameter group 1 may indicate DMRS configuration for LP and an RRC parameter group 2 may indicate DMRS configuration for NLP.

Similarly, a base station may make different respective CSI-RS configuration for LP and NLP.

As an example, a base station may configure, in a terminal, CSI-RS RE density for LP and CSI-RS RE density for NLP, respectively. As another example, in a terminal, CSI-RS RE density for LP is indicated via higher layer configuration, but CSI-RS RE density for NLP may be configured to follow a predesignated value.

Figure 13:
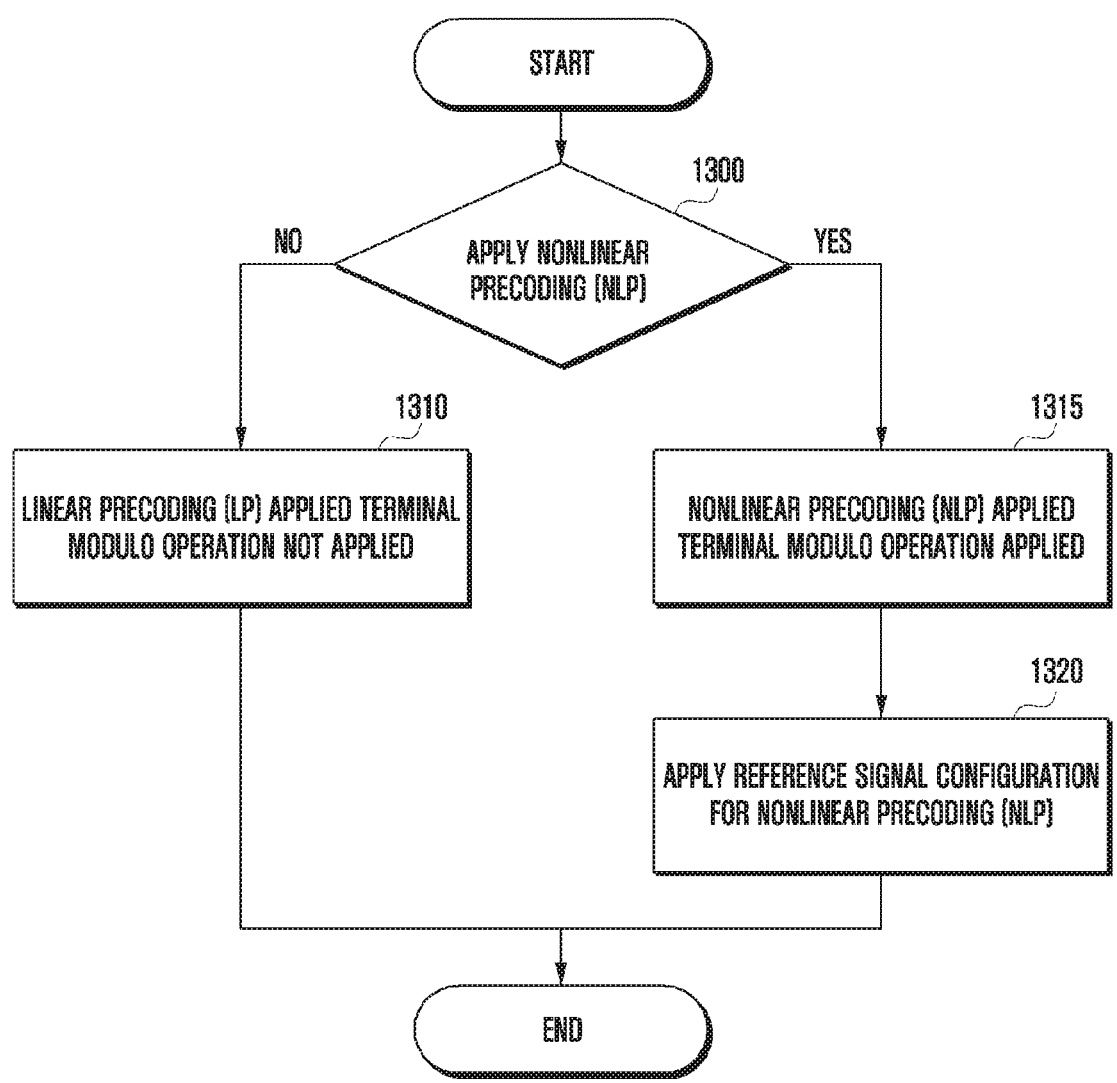
FIG. 13 is an operation flow diagram of a base station and a terminal according to various embodiments of the disclosure.

FIG. 13 illustrates an operation flow diagram of a base station and a terminal according to various embodiments of the disclosure.

Referring to FIG. 13, according to a signaling example of example 1, a base station notifies a terminal of whether or not NLP is applied (operation 1300). At this time, a base station may refer to a UE capability signaling of a terminal with respect to NLP according to the description of example 1. If a base station does not apply NLP to a terminal, the terminal presumes LP and does not apply a modulo operation at the time of signal reception (operation 1310). If a base station applies NLP to a terminal, the terminal presumes NLP and applies a modulo operation at the time of signal reception (operation 1315). In addition, a terminal may receive a reference signal by applying one of example 2 or example 3 (operation 1320).

Figure 14:
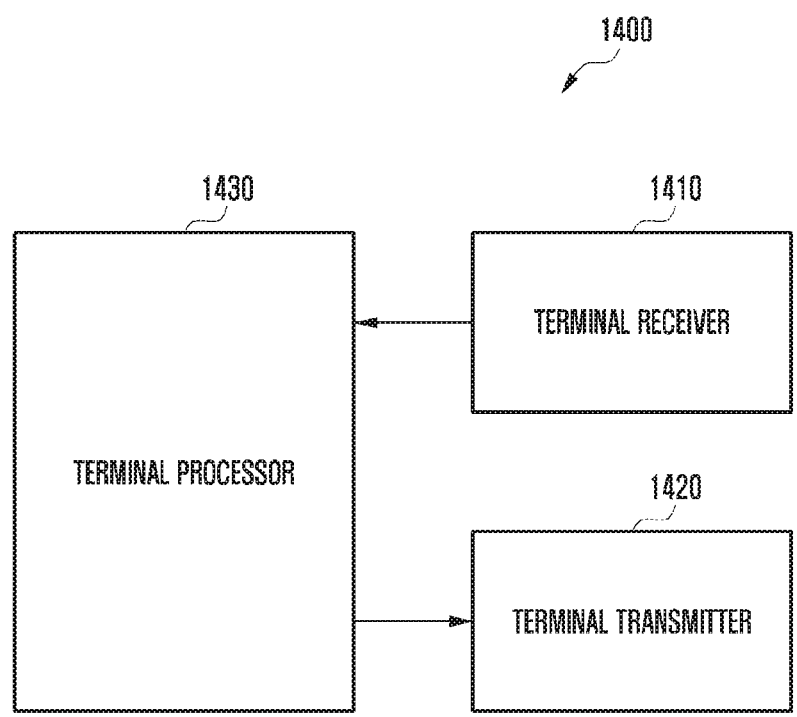
FIG. 14 is a block diagram of a terminal according to various embodiments of the disclosure.
Figure 15:
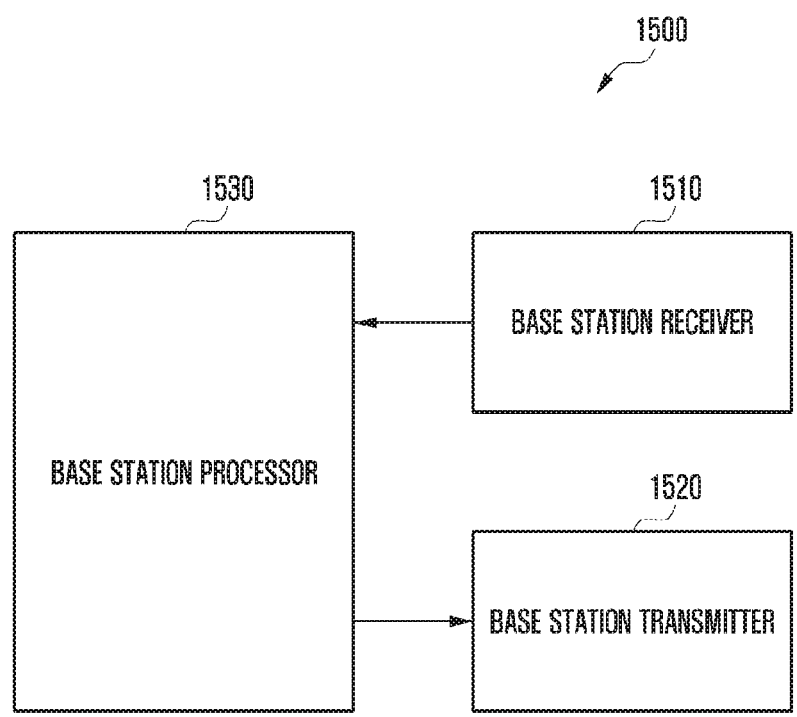
FIG. 15 is a block diagram of a base station according to various embodiments of the disclosure.

Transmitters, receivers, and processors of a terminal and a base station, which are for performing embodiments of the disclosure, are illustrated in FIG. 14 and FIG. 15, respectively. Embodiments 1 to 3 above show methods for configuring reference signals and signaling for NLP, and each of transmitters, receivers, and processors of a terminal and a base station should be operated according to embodiments to perform the methods.

Specifically, FIG. 14 is a block diagram of a terminal according to various embodiments of the disclosure.

As illustrated in FIG. 14, a terminal 1400 of the disclosure may include a terminal receiver 1410, a terminal transmitter 1420, and a terminal processor 1430. The terminal receiver 1410 and the terminal transmitter 1420 may be referred to in common as a transmitter/receiver (transceiver) in embodiments of the disclosure. The transmitter/receiver may transmit/receive signals to and from a base station. The signals may include control information, and data. To this end, the transmitter/receiver may include an RF transmitter which up-converts and amplifies frequencies of transmitted signals and an RF receiver which amplifies received signals in a low noise manner and down-converts frequencies. In addition, the transmitter/receiver may receive signals through a wireless channel and output the signals to the terminal processor 1430, and may transmit signals output from the terminal processor 1430 through the wireless channel. The terminal processor 1430 may control a series of processes so as to allow the terminal to operate according to embodiments of the disclosure. For example, the terminal receiver 1410 may receive signals including NLP related configuration information from a base station, and the terminal processor 1430 may control the NLP related configuration information and analyze the NLP related configuration information. The terminal processor 1430 may be referred to as a controller and may include at least one processor.

The terminal processor 1430 according to various embodiments of the disclosure may control the terminal transmitter 1420 and the terminal receiver 1410, such that the terminal transmitter 1420 transmits capability information (UE capability) of the terminal to a base station and the terminal receiver 1410 receives, from the base station, nonlinear precoding related information identified, based on the capability information of the terminal.

In this case, the nonlinear precoding related information may include information on whether or not nonlinear precoding is applied, and information for controlling reference signal configuration.

For example, whether or not the nonlinear precoding is applied may indicate whether or not a modulo operation is applied.

For example, when the nonlinear precoding is applied, the information for controlling reference signal configuration may indicate that transmission of a sounding reference signal (SRS) is omitted.

For example, when the nonlinear precoding is applied, the information for controlling reference signal configuration may indicate a frequency hopping resource position of a sounding reference signal (SRS).

For example, the information for controlling reference signal configuration may include information for setting at least one of the reference signal of demodulation reference signal (DM-RS) or channel state information reference signal (CSI-RS) different from each other based on the information on whether or not the nonlinear precoding is applied.

FIG. 15 is a block diagram of a base station according to various embodiments of the disclosure.

As illustrated in FIG. 15, a base station 1500 of the disclosure may include a base station receiver 1510, a base station transmitter 1520, and a base station processor 1530. The base station receiver 1510 and the base station transmitter 1520 may be commonly referred to as a transmitter/receiver (transceiver) in embodiments of the disclosure. The transmitter/receiver may transmit/receive signals to and from a terminal. The signals may include control information, and data. To this end, the transmitter/receiver may include an RF transmitter which up-converts and amplifies frequencies of transmitted signals and an RF receiver which amplifies received signals in a low noise manner and down-converts frequencies. In addition, the transmitter/receiver may receive signals through a wireless channel and output the signals to the base station processor 1530, and may transmit signals output from the base station processor 1530 through the wireless channel. The base station processor 1530 may control a series of processes so as to allow the base station to operate according to embodiments of the disclosure. For example, the base station processor 1530 may control the determination of application or non-application of NLP and a specific method, and production of NLP configuration/indication information to be transmitted to a terminal. Then, the base station transmitter 1520 transmits the NLP configuration/indication information to a terminal.

In addition, according to an embodiment of the disclosure, the base station processor 1530 may control the production of downlink control information (DCI) including reference signal processing information for the NLP. The base station processor 1530 may be referred to as a controller and may include at least one processor.

The base station processor 1530 according to various embodiments of the disclosure may control the base station receiver 1510 so as to receive, from a terminal, capability information (UE capability) of the terminal, may identify nonlinear precoding related information, based on the capability information of the terminal, and may control the base station transmitter 1520 so as to transmit the nonlinear precoding related information to the terminal.

In this case, the nonlinear precoding related information may include information on whether or not nonlinear precoding is applied, and information for controlling reference signal configuration.

For example, the information on whether or not the nonlinear precoding is applied may indicate whether or not a modulo operation is applied.

For example, when the nonlinear precoding is applied, the information for controlling reference signal configuration may indicate that transmission of a sounding reference signal (SRS) is omitted.

For example, when the nonlinear precoding is applied, the information for controlling reference signal configuration may indicate a frequency hopping resource position of a sounding reference signal (SRS).

For example, the information for controlling reference signal configuration may include information for setting at least one of the reference signal of demodulation reference signal (DM-RS) or channel state information reference signal (CSI-RS) different from each other based on the information on whether or not the nonlinear precoding is applied.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto, based on the technical spirit of the disclosure. Further, the above respective embodiments may be employed in combination, as necessary. For example, embodiment 1 and embodiment 2 or 3 of the disclosure may be partially combined to operate a base station and a terminal.

The invention claimed is:

1. A method of a terminal in a wireless communication system, the method comprising:
   transmitting capability information of the terminal associated with supporting nonlinear precoding to a base station; and
   receiving, from the base station, nonlinear precoding related information,
   wherein the nonlinear precoding related information is determined based on the capability information of the terminal,
   in case that the nonlinear precoding is applied to the terminal, wherein the nonlinear precoding related information comprises information for indicating to apply the nonlinear precoding, and information for controlling reference signal configuration,
   wherein the information for indicating to apply the nonlinear precoding comprises information for indicating to apply a modulo operation, and
   wherein the information for controlling reference signal configuration comprises information for indicating to omit transmission of a periodic or semi-persistent sounding reference signal (SRS).

2. The method of claim 1, in case that the nonlinear precoding is applied to the terminal, further comprising:
   receiving, from the base station, a message for indicating aperiodic SRS transmission;
   transmitting an aperiodic SRS to the base station based on the message; and
   receiving data to which the nonlinear precoding is applied.

3. The method of claim 1, wherein the information for controlling reference signal configuration comprises information for indicating a frequency hopping resource position of a sounding reference signal (SRS).

4. The method of claim 1, wherein the information for controlling reference signal configuration comprises information for setting at least one of a reference signal of a demodulation reference signal (DM-RS) or a channel state information reference signal (CSI-RS) to be different from each other based on the information on whether or not the nonlinear precoding is applied.

5. A method of a base station in a wireless communication system, the method comprising:
   receiving, from a terminal, capability information of the terminal associated with supporting nonlinear precoding;
   determining whether to apply the nonlinear precoding to the terminal and nonlinear precoding related information, based on the capability information of the terminal; and transmitting the nonlinear precoding related information to the terminal, in case that the nonlinear precoding is applied to the terminal, wherein the nonlinear precoding related information comprises information for indicating to apply the nonlinear precoding, and information for controlling reference signal configuration, wherein the information for indicating to apply the nonlinear precoding comprises information for indicating to apply a modulo operation, and wherein the information for controlling reference signal configuration comprises information for indicating to omit transmission of a periodic or semi-persistent sounding reference signal (SRS).

6. The method of claim 5, wherein in case that the nonlinear precoding is applied to the terminal, further comprising:

transmitting, to the terminal, a message for indicating aperiodic SRS transmission;

receiving, from the terminal, an aperiodic SRS based on the message;

identifying a channel state based on the aperiodic SRS;

transmitting data to which nonlinear precoding is applied.

7. The method of claim 5, wherein the information for controlling reference signal configuration comprises information for indicating a frequency hopping resource position of a sounding reference signal (SRS).

8. The method of claim 5, wherein the information for controlling reference signal configuration comprises information for setting at least one of a reference signal of a demodulation reference signal (DM-RS) or a channel state information reference signal (CSI-RS) to be different from each other based on the information on whether or not the nonlinear precoding is applied.

9. A terminal in a wireless communication system, the terminal comprising:

a transceiver; and a controller configured to:

transmit capability information of the terminal associated with supporting nonlinear precoding to a base station, and receive, from the base station, nonlinear precoding related information, wherein the nonlinear precoding related information is determined based on the capability information of the terminal, in case that the nonlinear precoding is applied to the terminal, wherein the nonlinear precoding related information comprises information for indicating to apply the nonlinear precoding, and information for controlling reference signal configuration, wherein the information for indicating to apply the nonlinear precoding comprises information for indicating to apply a modulo operation, and wherein the information for controlling reference signal configuration comprises information for indicating to omit transmission of a periodic or semi-persistent sounding reference signal (SRS).

10. The terminal of claim 9, wherein in case that the nonlinear precoding is applied to the terminal, the controller is further configured to:

receive, from the base station, a message for indicating aperiodic SRS transmission;

transmit an aperiodic SRS to the base station based on the message; and receive data to which the nonlinear precoding is applied.

11. The terminal of claim 9, wherein the information for controlling reference signal configuration comprises information for indicating a frequency hopping resource position of a sounding reference signal (SRS).

12. The terminal of claim 9, wherein the information for controlling reference signal configuration comprises information for setting at least one of a reference signal of a demodulation reference signal (DM-RS) or a channel state information reference signal (CSI-RS) to be different from each other based on the information on whether or not the nonlinear precoding is applied.

13. A base station in a wireless communication system, the base station comprising:

a transceiver; and a controller configured to:

receive, from a terminal, capability information of the terminal associated with supporting nonlinear precoding, determine whether to apply the nonlinear precoding to the terminal and nonlinear precoding related information, based on the capability information of the terminal, and controls the transmitter/receiver so as to transmit the nonlinear precoding related information to the terminal, in case that the nonlinear precoding is applied to the terminal, wherein the nonlinear precoding related information comprises information for indicating to apply the nonlinear precoding, and information for controlling reference signal configuration, wherein the information for indicating to apply the nonlinear precoding comprises information for indicating to apply a modulo operation, and wherein the information for controlling reference signal configuration comprises information for indicating to omit transmission of a periodic or semi-persistent sounding reference signal (SRS).

14. The base station of claim 13, wherein in case that the nonlinear precoding is applied to the terminal, the controller is further configured to:

transmit, to the terminal, a message for indicating aperiodic SRS transmission;

receive, from the terminal, an aperiodic SRS based on the message;

identify a channel state based on the aperiodic SRS;

transmit data to which nonlinear precoding is applied.

15. The base station of claim 13, wherein the information for controlling reference signal configuration comprises information for indicating a frequency hopping resource position of a sounding reference signal (SRS).

* * * * *